(12) United States Patent
Nojiri et al.

(10) Patent No.: US 11,138,766 B2
(45) Date of Patent: Oct. 5, 2021

(54) METHOD FOR EXPRESSING IMAGE WITH COLORS AND COLOR EXPRESSION DRAWING

(71) Applicant: T. HASEGAWA CO., LTD., Tokyo (JP)

(72) Inventors: Kensuke Nojiri, Kawasaki (JP); Atsushi Nakamura, Kawasaki (JP); Mengning Qian, Kawasaki (JP)

(73) Assignee: T. HASEGAWA CO., LTD., Tokyo (JP)

( * ) Notice: Subject to any disclaimer, the term of this patent is extended or adjusted under 35 U.S.C. 154(b) by 89 days.

(21) Appl. No.: 16/675,758

(22) Filed: Nov. 6, 2019

(65) Prior Publication Data

US 2020/0175728 A1    Jun. 4, 2020

Related U.S. Application Data

(63) Continuation-in-part of application No. PCT/JP2018/016383, filed on Apr. 18, 2018.

(30) Foreign Application Priority Data

May 8, 2017  (JP) .............................. JP2017-092177

(51) Int. Cl.
*G06T 11/00* (2006.01)
*G06T 7/00* (2017.01)
*G06T 7/90* (2017.01)

(52) U.S. Cl.
CPC ............ *G06T 11/001* (2013.01); *G06T 7/001* (2013.01); *G06T 7/90* (2017.01); *G06T 7/97* (2017.01); *G06T 2207/10024* (2013.01)

(58) Field of Classification Search
None
See application file for complete search history.

(56) References Cited

U.S. PATENT DOCUMENTS 5,571,401 A * 11/1996 Lewis .................. G01N 27/126
                                                            205/787
5,949,522 A *  9/1999 Manne .................... A61L 9/122
                                                            261/104
(Continued)

FOREIGN PATENT DOCUMENTS

CN        85107554 A      4/1987
CN        1292492 A       4/2001
(Continued)

OTHER PUBLICATIONS

International Search Report and Written Opinion issued in PCT/JP2018/016383, with English translation.
(Continued)

*Primary Examiner* — Andrae S Allison
(74) *Attorney, Agent, or Firm* — Browdy and Neimark, PLLC

(57) ABSTRACT

The method of the invention expresses an image with colors by creating a color expression drawing that corresponds to the image to be visualized, wherein:
  in a first step, n subject(s) each select(s), from among a color sample group that includes color samples including A×B types of color samples, S types of color samples that correspond to the image, and assign(s) a contribution degree for each of the selected color samples;
  in a second step, an expression chart of each of the n subject(s) is created using the contribution degrees assigned and the color samples of the color sample group;
  in a third step, for each samples, the contribution degree(s) included in the expression chart(s) of the n subject(s) are summed, thereby obtaining the sums of the contribution degrees of the n subject(s) for the respective color samples,
where A, B, S≥2, and n≥1.

20 Claims, 25 Drawing Sheets
(25 of 25 Drawing Sheet(s) Filed in Color)

(56) References Cited

U.S. PATENT DOCUMENTS

| | | | |
|---|---|---|---|
| 7,242,312 B2 | 7/2007 | Kamiya | |
| 7,718,119 B2* | 5/2010 | Tajima | A61M 21/00 422/5 |
| 2001/0001303 A1* | 5/2001 | Ohsuga | A63F 13/28 482/5 |
| 2011/0172931 A1* | 7/2011 | Murthy | G16C 20/20 702/32 |
| 2012/0002404 A1* | 1/2012 | Ma | A45C 15/06 362/154 |
| 2013/0120788 A1* | 5/2013 | Wang | G06K 9/00 358/1.15 |
| 2020/0096491 A1* | 3/2020 | Kuroki | G01N 33/0034 |

FOREIGN PATENT DOCUMENTS

| | | |
|---|---|---|
| CN | 1301955 A | 7/2001 |
| CN | 1367891 A | 9/2002 |
| CN | 1656535 A | 8/2005 |
| CN | 2845878 Y | 12/2006 |
| CN | 1898693 A | 1/2007 |
| CN | 101211518 A | 7/2008 |
| CN | 102228221 A | 11/2011 |
| CN | 103297591 A | 9/2013 |
| CN | 104885403 A | 9/2015 |
| CN | 104969280 A | 10/2015 |
| CN | 105890764 A | 8/2016 |
| CN | 102426399 A | 4/2021 |
| JP | 2007-47503 A | 2/2007 |
| JP | 2008-225238 A | 9/2008 |
| JP | 2013-124953 * | 6/2013 |
| KR | 10-0522486 B1 | 10/2005 |
| WO | 2012/053188 A1 | 4/2012 |

OTHER PUBLICATIONS

Japanese version of International Preliminary Report on Patentability of Chapter I issued in PCT/JP2018/016383, with English translation.

Miura et al., Harmony between color and fragrance, J. Japan Association on Odor Environment, vol. 42, No. 52 (2011).

Tada, Manami, Suga, Ikuko, Kondo, Emi, "Color Representing imaged from Aroma", Journal of the Color Science Assosiation of Japan), vol. 36, pp. 180-181, (May 1, 2012).

Sendo, Masami, Motonaga, Chiho, "Color Image of Fragrances as a Means of Communication", Journal of Japan Society of Kansai Engineering, vol. 7, No. 3, pp. 497-503, (2008).

Nojiri, Kensuke, Nakamura, Akio, Nakamura, Tetsuya, Saito, Tsukasa, "Utilization of color when expressing fragrance—Visualization technique for image and suggestion of aroma rainbow-", Proceedings (CD-ROM) of 19th meeting of Japan Society of Kansai Engineering, pp. ROMBUNNO.P32, non-official translation (Sep. 25, 2017).

Office Action dated Feb. 25, 2021 issued in the corresponding Chinese patent application No. 201880028936.1 with its English Machine Translation.

Liusha et al., Design psychology, p. 158-162 (2016).

* cited by examiner

METHOD FOR EXPRESSING IMAGE WITH COLORS AND COLOR EXPRESSION DRAWING

TECHNICAL FIELD

The present invention relates to a method for expressing an image with colors, a color expression drawing, a set, a method for expressing a scent, a method for compounding a scent, a method for determining a color, and a method for evaluating similarity between images.

BACKGROUND ART

The images of scents, text, people, and the like play a significant role in the lives of humans. For example, these images are a major factor in determining quality in the fields of food and drink, luxury goods, and cosmetics.

However, it is a fact that accurately conveying these images and, in particular, images of scents, to other people so as to share the image with other people is extremely difficult. For example, scents are typically expressed by using text (or language). However, such methods do not result in the image of the scent being accurately shared. This is because of differences in the interpretations of the text and differences in images evoked by that text. Since it is not possible to accurately share images of scents, there is a large problem, particularly among product developers of food and drink products, luxury goods, and cosmetics, when implementing changes to scents or the like.

Patent Literature 1 describes a method for numerizing quantitative features of a scent. In this method, a plurality of subjects each select a color of an image corresponding to a scent to be visualized, each color selected by each subject is selected as one or more color element units comprising the same area, an average value of lightness values is calculated on the basis of all of the color element units selected by the subjects, and a quantitative feature of the scent is expressed using this average value. Paragraph 0014 of Patent Literature 1 recites that "the plurality of subjects selecting colors that correspond to the image of the scent results in the image of the scent being expressed by a plurality of different colors", and is premised on each individual subject selecting one type of color. Furthermore, paragraph 0018 of Patent Literature 1 discloses a limitation of "selecting one color sample."

Patent Literature 2 proposes a method that is similar to that of Patent Literature 1. Paragraph 0015 of Patent Literature 2 recites that "the plurality of subjects selecting colors that correspond to the image of the scent results in the image of the scent being expressed by a plurality of different colors", and is premised on each individual subject selecting one type of color.

Non-Patent Literature 1 investigates the harmony between color and scent by making subjects select, from 18 types of colors expressed in the two-dimensions of hue and tone, a plurality of colors that harmonize with the scent. Specifically, the subjects are made to select three types of color samples.

CITATION LIST

Patent Literature

Patent Literature 1: JP-A-2008-225238
Patent Literature 2: JP-A-2007-47503

Non-Patent Literature

Non-Patent Literature 1: J. Japan Association on Odor Environment, Vol. 42, No. 52 (2011)

SUMMARY OF THE INVENTION

Problems to be Solved by the Invention

The methods described in Patent Literature 1 and 2 include multiple color samples without modification, and the features of hue, saturation (or chroma or colorfulness), and lightness (or value or brightness) are not systematic. Consequently, with these methods, it is difficult to convey and share images with objectively high reproducibility. In addition, in these methods, only one type of color sample that corresponds to the scent is selected and, as such, there is a burden caused by the subjectivity of the subjects (for example, a subject mainly desires to select pink, but also slightly desires to select black).

In the method described in Non-Patent Literature 1, three types of color samples are selected. However, in this case, since the contribution degrees of the selected colors are not considered, there is a burden caused by the subjectivity of the subjects (for example, a subject selects pink as the first color, black as the second color and, even though does not sense a third color, selects green; or attempts to more effectively express a single color in terms of blended colors).

The methods described in Patent Literature 1 and 2 and Non-Patent Literature 1 do not provide means for visualizing images such that the selected color samples can be intuitively shared with other people. Consequently, with these methods, scent images cannot be intuitively shared.

An object of the present invention is to provide a method for expressing an image with colors whereby the image can be visualized such that the burden on subjects is light, reproducibility is high, and the image can be intuitively shared with other people.

Another object of the present invention is to provide a color expression drawing whereby an image can be visualized such that reproducibility is high and the image can be intuitively shared with other people.

Another object of the present invention is to provide a set including the color expression drawing and a scent to be visualized, a method for expressing a scent and a method for compounding a scent using this set, and a method for determining a color and a method for evaluating similarity between images using the color expression drawing.

Means for Solving the Problems

The inventors have conducted extensive studies in order to solve the problems described above and, as a result, discovered that it is possible to visualize an image such that the burden on the subject is light, reproducibility is high, and the image can be intuitively shared with other people by causing subjects to select two or more color samples that match an image to be visualized from among a systematically arranged color sample group including at least a first system and a second system, and also causing the subjects to respond with contribution degrees of the selected color samples, thereby arriving at the present invention.

Specific means for solving the problems described above, that is, the present invention and preferable aspects thereof are as follows:

[1] A method for expressing an image with colors, the method including:

creating a color expression drawing that corresponds to the image via:

a first step in which a subject selects, from among a color sample group that includes color samples including at least A×B types of color samples, S types of color samples that correspond to an image to be visualized, and also assigns a contribution degree $p_s$ for each selected color samples, where A≥2, B≥2, and S≥2;

a second step in which an expression chart of the subject is created by giving a value, that corresponds to the contribution degree $p_s$ assigned in the first step, to each of the color samples of the color sample group; and a third step in which n subject(s) perform(s) the first step and the second step for the same image, and values corresponding to the contribution degrees included in the expression chart of each of the subjects are summed; where n≥1; wherein the color sample group includes a first system of A kinds of colors and a second system of B kinds of colors, and the color sample group includes a portion arranged in a first direction in order of the first system and, also, arranged in a second direction in order of the second system.

[2] The method for expressing an image with colors according to [1], wherein the image is an image of a scent smelled by the subject.

[3] The method for expressing an image with colors according to [1], wherein the image is an image of a text viewed by the subject.

[4] The method for expressing an image with colors according to [1], wherein the image is an image of a person viewed by the subject.

[5] The method for expressing an image with colors according to any one of [1] to [4], wherein the first system is A kinds of hues.

[6] The method for expressing an image with colors according to any one of [1] to [5], wherein the second system is B kinds of tones, and the tones are determined by lightness and saturation.

[7] The method for expressing an image with colors according to any of [1] to [6], wherein the color sample group further includes a third system for C type(s) of color textures, thereby including A×B+C types of color samples, where A≥2, B≥2, and C≥1.

[8] The method for expressing an image with colors according to [7], wherein the third system is C=2 metallic colors, and the metallic colors are gold and silver.

[9] The method for expressing an image with colors according to any one of [1] to [8], wherein the color expression drawing is a graph in which a range that includes at least the A kinds of the first system of the color sample group is set on a horizontal axis, and values obtained by summing (A1) the sums of the values that correspond to the contribution degrees, or (A2) values obtained by converting, to rates, the sums of the values that correspond to the contribution degrees for each type of the first system are set on the vertical axis.

[10] The method for expressing an image with colors according to any one of [1] to [8], wherein:

the color expression drawing is a color arrangement table in which each of the colors is arranged in an arrangement identical to the color sample group;

a portion corresponding to each of the colors of the color arrangement table includes a color palette; and (B1) the color palette is expressed using the sum of the values that correspond to the contribution degrees of each of the colors, or a value obtained by converting, to a rate, the sum of the values that correspond to the contribution degrees of each of the colors, or (B2) the color palette includes the number of steps determined by converting, to a rate, the sum of the values that correspond to the contribution degrees of each of the colors, and standardizing for each predetermined range of the rate.

[11] The method for expressing an image with colors according to any one of [1] to [8], wherein:

the color expression drawing is a rose diagram that includes a polygonal core with at least A sides that correspond to the A kinds of the first system of the color sample group, color palettes of all of the colors belonging to the first system are arranged in directions substantially parallel to each of the sides of the polygon that correspond to the A kinds of the first system, steps of each of the color palettes are stacked and arranged on extending lines radiating from inside the core, and the number of steps of the color palette of each of the colors is determined by converting, to a rate, the sum of the values that correspond to the contribution degrees of each of the colors, and standardizing for each predetermined range of the rate.

[12] The method for expressing an image with colors according to [11], wherein the core of the rose diagram is a polygonal core with A+c sides that includes sides that correspond to the A kinds of the first system and c kind(s) of the third system of the color sample group.

[13] The method for expressing an image with colors according to any one of [10] to [12], wherein a shape of the color palette is circular or a polygonal shape with at least three sides.

[14] A color expression drawing corresponding to an image and created by:

a first step in which a subject selects, from among a color sample group that includes color samples including at least A×B types of color samples, S types of color samples that correspond to an image to be visualized, and also assigns a contribution degree $p_s$ for each selected color samples, where A≥2, B≥2, and S≥2;

a second step in which an expression chart of the subject is created by giving a value, that corresponds to the contribution degree $p_s$ assigned in the first step, to each color sample of the color sample group; and a third step in which n subject(s) perform(s) the first step and the second step for the same image, and values corresponding to the contribution degrees included in the expression chart of each subject are summed; where n≥1; wherein the color sample group includes a first system of A kinds of colors and a second system of B kinds of colors, and the color sample group includes a two-dimensionally arranged portion arranged in a first direction in order of the first system and, also, arranged in a second direction in order of the second system.

[15] The color expression drawing according to [14], wherein the color expression drawing is a graph in which the A kinds of the first system of the color sample group is set on a horizontal axis, and values obtained by summing (A1) the sums of the values that correspond to the contribution degrees, or (A2) values obtained by converting, to rates, the sums of the values that correspond to the contribution degrees for each type of the first system are set on the vertical axis.

[16] The color expression drawing according to [14], wherein:

the color expression drawing is a color arrangement table in which each of the colors is arranged in an arrangement identical to the color sample group;

a portion corresponding to each of the colors of the color arrangement table includes a color palette; and (B1) the color palette is expressed using the sum of the values that correspond to the contribution degrees of each of the colors, or a value obtained by converting, to a rate, the sum of the values that correspond to the contribution degrees of each of the colors, or (B2) the color palette includes the number of steps determined by converting, to a rate, the sum of the values that correspond to the contribution degrees of each color, and standardizing for each predetermined range of the rate.

[17] The color expression drawing according to [14], wherein:

the color expression drawing is a rose diagram that includes a polygonal core with at least A sides that correspond to the A kinds of the first system of the color sample group, color palettes of all of the colors belonging to the first system are arranged in directions substantially parallel to each of the sides of the polygon that correspond to the A kinds of the first system, steps of each of the color palettes are stacked and arranged on extending lines radiating from inside the core, and the number of steps of the color palette of each of the colors is determined by converting, to a rate, the sum of the values that correspond to the contribution degrees of each of the colors, and standardizing for each predetermined range of the rate.

[18] The color expression drawing according to [17], wherein the core of the rose diagram is a polygonal core with A+c sides that includes sides that correspond to the A kinds of the first system and c kind(s) of the third system of the color sample group.

[19] The color expression drawing according to any one of [16] to [18], wherein a shape of the color palette is circular or a polygonal shape with at least three sides.

[20] A color expression drawing that is a rose diagram that includes a polygonal core with at least A sides, where A≥2; wherein color palettes are arranged in directions substantially parallel to sides of a polygon, and steps of the color palettes are stacked and arranged on extending lines radiating from inside of the core.

[21] A set including the color expression drawing according to any one of [14] to [19], and a scent to be visualized.

[22] A method for expressing a scent, the method including:

a fourth step in which the evaluator, that has smelled the scent included in the set according to [21], expresses an image to which the scent is to be changed using colors included in a color expression drawing.

[23] A method for compounding a scent, the method including:

a fifth step in which a new scent to be visualized is compounded;

a sixth step in which the new scent to be visualized is expressed by the method for expressing an image with colors according to any one of [1] to [13]; and a seventh step in which similarity is confirmed between a color expression drawing of an image to which the scent is to be changed that is expressed by an evaluator using the method for expressing a scent according to [22], and the color expression drawing expressed in the sixth step.

[24] A method for determining a color, the method including determining, in correspondence with the colors included in the color expression drawing according to any one of [14] to [19], a color of a fragrance that provides a scent to be visualized, a color of a flavored product to which a flavor that provides the scent to be visualized is added, or a color of a packaging of a fragrance or a flavored product.

[25] A method for evaluating similarity of images, the method including a step in which similarity is confirmed between at least two types of the color expression drawings according to any one of [14] to [20].

[26] The method for evaluating similarity between images according to [25], wherein:

when the color expression drawing is a color arrangement table in which each of the colors is arranged in an arrangement identical to the color sample group; and a portion corresponding to each of the colors of the color arrangement table includes a color palette;

it is preferable that the similarity between the color expression drawings is determined on the basis of (C1) a correlation coefficient or a pattern similarity that uses a sum of values that correspond to contribution degree of each of the colors expressed by the color palette, or a value obtained by converting, to a rate, a sum of the values that correspond to the contribution degrees of each of the colors, or (C2) a correlation coefficient or a pattern similarity that uses the number of steps obtained by converting, to a rate, the sum of the values that correspond to the contribution degrees of each of the colors of the color palette, and standardizing for each predetermined range of the rate.

Effect of the Invention

According to the present invention, a method for expressing an image with colors can be provided whereby the image can be visualized such that the burden on subjects is light, reproducibility is high, and the image can be intuitively shared with other people.

Additionally, according to the present invention, a color expression drawing can be provided whereby an image can be visualized such that reproducibility is high and the image can be intuitively shared with other people.

Furthermore, according to the present invention, a set including the color expression drawing and a scent to be visualized, a method for expressing a scent and a method for compounding a scent using this set, and a method for determining a color and a method for evaluating similarity between images using the color expression drawing can be provided.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE INVENTION

Figure 1:
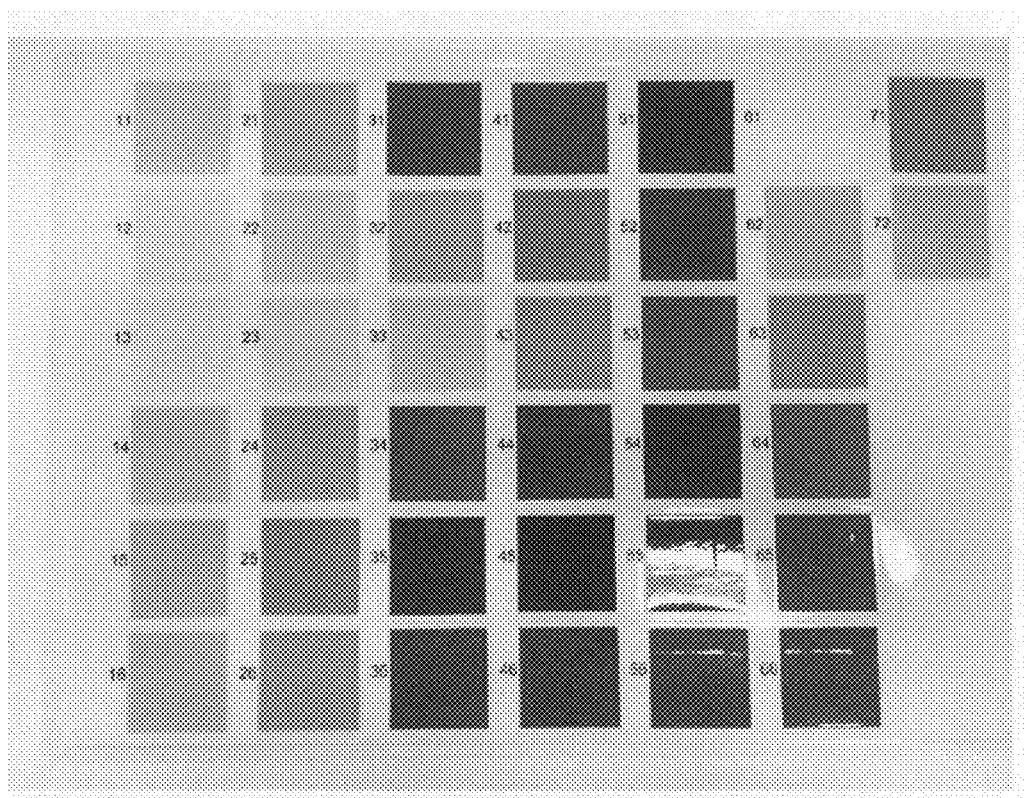
FIG. 1 is a photograph of an example of a color sample group used in the method for expressing an image with colors of the present invention.

Hereinafter, the present invention is described in detail. While the following descriptions of the constituents are based on representative embodiments and specific examples, the present invention should not be construed as being limited thereto. In the present specification, a numerical range described with "to" indicates that numbers before and after "to" are included in the numeral range as lower and upper limit values.

Method for Expressing an Image with Colors

The method for expressing an image with colors of the present invention includes:

creating a color expression drawing that corresponds to the image via:

a first step in which a subject selects, from among a color sample group that includes color samples including at least A×B types of color samples, S types of color samples that correspond to an image to be visualized, and also assigns a contribution degree $p_s$ for each selected color samples; where A≥2, B≥2, and S≥2;

a second step in which an expression chart of the subject is created by giving a value, that corresponds to the contribution degree $p_s$ assigned in the first step, to each color sample of the color sample group; and a third step in which n subject(s) perform(s) the first step and the second step for the same image, and values corresponding to the contribution degrees included in the expression chart of each of the subjects are summed; where n≥1; wherein the color sample group includes a first system of A kinds of colors and a second system of B kinds of colors, and the color sample group includes a portion arranged in a first direction in order of the first system and, also, arranged in a second direction in order of the second system.

As a result of this configuration, according to the present invention, the image can be visualized such that the burden on the subjects is light, reproducibility is high, and the image can be intuitively shared with other people.

Information of the color expression drawing is easily conveyed, managed, and stored. As such, this information can be conveyed in a short amount of time using e-mail or the like, and can be stocked as data on a personal computer. Moreover, the features of the image of a scent or the like can be expressed as a color expression drawing without words. As such, variation among evaluators (people other than the subjects) is small, reproducibility is high, and the features can be acquired as objective data.

Since the subjects select two or more types of color samples along with the contribution degrees of the color samples, the image can be visualized such that reproducibility is high and the image can be intuitively shared with other people, even when the number of subjects is few (the pattern similarity with more objective cases, in which the number of subjects is great, increases).

The subjectivity of the subjects (for example, the subject mainly desires to select pink, but also slightly desires to select black) can be reflected in the contribution degrees.

In this specification, the "color expression drawing" is defined as the sum of the (values corresponding to the contribution degrees of the) expression charts of n individual subject(s).

The preferable scope of the color expression drawings created in the method for expressing an image with colors of the present invention is discussed later in the section of the present invention about the color expression drawing.

Hereinafter, preferable embodiments of the present invention will be described.

First Step

In the first step, a subject selects, from among a color sample group that includes color samples including at least A×B types of color samples, S types of color samples that correspond to an image to be visualized, and also assignes a contribution degree $p_s$ for each selected color samples. Here, A≥2, B≥2, and S≥2.

Image

The type of image to be visualized is not limited. Examples of types of images include images of objects such as scents, texts, people (name or photograph of a person, an actual person, or the like), sounds, textures, tastes, and combined objects thereof (scent and taste, or the like). The texts are not particularly limited. Examples of the texts include hiragana, katakana, kanji, and romanizations used in the Japanese language, and characters used in foreign languages (for example, Hangul and the like). Likewise, the names of people are not particularly limited. For example, a name of a person written in characters used in the Japanese language may be used or a name of a person written in characters used in a foreign language may be used.

In the present invention, the image to be visualized is preferably at least one of an image of a scent smelled by the subject, an image of text viewed by the subject, and an image of a person viewed by the subject.

Color Sample Group

The color sample group includes at least A×B types of color samples.

Specifically, the color sample group includes a first system of A kinds of colors and a second system of B kinds of colors.

The color sample group includes a portion arranged in a first direction in order of the first system and, also, arranged in a second direction in order of the second system.

In the present invention, it is preferable that the first system is implemented as A kinds of hues. It is preferable that A is from 2 to 100, more preferable that A is from 3 to 10, and even more preferable that A is from 5 to 7.

In the present invention, it is preferable that the second system is implemented as B kinds of tones and that the tones are defined on the basis of lightness and saturation. It is preferable that B is from 2 to 100, more preferable that B is from 3 to 10, and even more preferable that B is from 4 to 6.

The hues and the tones can be selected from known color systems. For example, the color system called Practical Color Co-ordinate System (PCCS) that was developed by the Japan Color Research Institute with color harmonization as the primary aim, the standard color sample created on the basis of "JIS Z8721 Color specification—Specification according to their three attributes", the Munsell international standard color sample, and also commercially available color samples or color charts may be used. Among these, it is preferable that the hues and the tones be selected from the PCCS. Examples of the hues of PCCS include red, orange, yellow, green, blue, and purple. Examples of the tones of PCCS include pale, light, vivid, deep, and dark.

It is sufficient that the first system and the second system of the color sample group are formally determined. In addition, when desired, the first system and the second system may be interchanged.

In the present invention, it is preferable that the color sample group further includes a third system for C type(s) of color textures, thereby including A×B+C (where A≥2, B≥2, and C≥1) types of color samples. It is preferable that C is from 1 to 100, more preferable that C is from 2 to 20, and even more preferable that C is from 6 to 10.

Examples of the third system for color textures include achromatic colors, metallic (glossy) colors, and patterns (uneven color). Among these, it is preferable that achromatic colors and/or metallic colors is used because doing so increases the possibility of matching the subjectivity, of the subject, of the color that matches the image to be visualized. In the present invention, it is preferable that the third system includes metallic colors, and that the metallic colors are gold and silver. It is more preferable that both achromatic colors and the metallic colors are used.

Examples of the achromatic colors include white, gray, and black. Two or more different shades of gray may be used as the gray. It is preferable that there are 1 to 10 types of the achromatic colors, more preferable that there are 2 to 9 types of the achromatic colors, and even more preferable that there are 4 to 8 types of the achromatic colors.

Examples of the metallic colors include gold and silver, and also all other known metallic colors. It is preferable that there are 1 to 5 types of the metallic colors, more preferable that there are 2 or 3 types of the metallic colors, and even more preferable that there are 2 types of the metallic colors.

The patterns (uneven colors) are not particularly limited, and examples thereof include matte and marbled.

The first direction and the second direction are not limited to linear directions from a particular start point, and may be curved, as desired. That is, the color samples may be arranged in a distorted manner instead of in a two-dimensional arrangement. However, it is more preferable that a two-dimensional arrangement be used for the at least A×B types of color samples because doing so reduces the burden on the subject and increases reproducibility. It is even more preferable that two-dimensional arrangements be used for all of color samples because doing so reduces the burden on the subject and increases reproducibility.

Color Samples

The subject selects S types (where S≥2) of color samples. It is preferable that S is from 2 to 20, more preferable that S is from 2 to 3, and even more preferable that S is 2.

When the subject selects the S types of color samples, the subject also assigns the contribution degree $p_s$ for each selected color sample. The contribution degree $p_s$ can be expressed as a rate, a percentage, or the like. The subject does not need to assign a contribution degree for the color sample that is not selected, but for convenience, the subject may assign zero as the contribution degree, for example, for the color sample that is not selected. The sum of the contribution degrees of the S types of color samples that are selected may be less than 1 (=100%). In one example, an analysis is possible in which the sum of the contribution degrees of the S types of color samples that are selected is 0.8 (=80%), and other colors account for 0.2 (=20%).

It is preferable that the sum of the contribution degrees is 1 (=100%).

Second Step

In the second step, an expression chart of the subject is created by giving a value, that corresponds to the contribution degree $p_s$ assigned in the first step, to each color sample of the color sample group.

Analysis using a known pivot table or the like can be used as the method for creating the expression chart of the subject.

In the resulting expression chart of one subject, it is preferable that the sum of the contribution degrees given to all of the color samples is 1 (=100%).

Third Step

In the third step, n subject(s) (where n≥1) perform(s) the first step and the second step for the same image, and the values corresponding to the contribution degrees included in the expression chart of each of the subjects are summed. It is preferable that n is from 2 to 1000, more preferable that n is from 5 to 100, even more preferable that n is from 10 to 50, and yet even more preferable that n is from 10 to 20. When n is 2 or greater, color samples that correspond to the image to be visualized are selected by a plurality of subjects. As such, the types of expressed color samples may increase, and many color samples that multiple subjects determine, on average, to match can be included for that image. It is more preferable that n is 10 or greater because, in such a case, the image can be visualized such that greater reproducibility of the visualization of scent images can be obtained and the image can be more intuitively shared with other people.

In the color expression drawing obtained by summing the expression charts obtained for the n subject(s), the sum of the contribution degrees given to all of the color samples is n (=n×100%).

Color Expression Drawing

The color expression drawing of the present invention corresponds to an image and is created by:

a first step in which a subject selects, from among a color sample group that includes color samples including at least A×B types of color samples, S types (where S≥2) of color samples that correspond to an image to be visualized, and also assigns a contribution degree $p_s$ for each selected color samples;

a second step in which an expression chart of the subject is created by giving a value, that corresponds to the contribution degree $p_s$ assigned in the first step, to each color sample of the color sample group; and a third step in which n subject(s) perform(s) the first step and the second step for the same image, and values corresponding to the contribution degrees included in the expression chart of each subject are summed, where n≥1; wherein the color sample group includes a first system of A kinds of colors and a second system of B kinds of colors, and the color sample group includes a two-dimensionally arranged portion arranged in a first direction in order of the first system and, also, arranged in a second direction in order of the second system.

Preferable modes of the first step, the second step, and the third step, as well as the color sample group are the same as the preferable modes described for the method for expressing an image with colors of the present invention.

Examples of preferable modes of the color expression drawing of the present invention include a first mode, a second mode, and a third mode (described later). However, other modes may also be used.

The color expression drawing of the present invention is created by the method for expressing an image with colors of the present invention. The color expression drawing of the present invention reflects the statistical processing of the method for expressing an image with colors. As such, it is impossible to directly identify the color expression drawing on the basis of the structure or features of the color expression drawing itself.

Note that, however, the shape itself of the third mode of the color expression drawing of the present invention is also novel. Therefore, a color expression drawing (also referred to as a fourth mode of the color expression drawing of the present invention) related to the shape, obtained by excluding the statistical processing part from the third mode of the color expression drawing of the present invention, corresponds to a case in which the color expression drawing is not defined by the manufacturing method thereof.

Hereinafter, the preferable modes of the color expression drawing of the present invention, namely the first mode, the second mode, and the third mode, the fourth mode that is another mode, and other modes will be described.

First Mode

The first mode of the color expression drawing of the present invention is a graph in which the first system of A kinds of color samples is set on the horizontal axis, and values obtained by summing (A1) the sums of the values that correspond to the contribution degrees, or (A2) values obtained by converting the sums of the values that correspond to the contribution degrees to rates for each type of the first system are set on the vertical axis.

In the first mode of the color expression drawing of the present invention, the first system of A kinds of color samples is set on the horizontal axis, but another system may be added to the horizontal axis, as desired. For example, the first system of A kinds and the third system of C type(s)/c kind(s) may be set on the horizontal axis.

Here, with the color expression drawing created by the method for expressing an image with colors of the present invention, in the color expression drawings obtained by summing the expression charts of the n subject(s) obtained in the third step, the sums of the contribution degrees given to all of the color samples are n (=n×100%).

In the first mode of the color expression drawing of the present invention, when the sums of the values that correspond to the contribution degrees are further summed for each type of the first system (A1), the value of this n (=n×100%) is used as the summed value.

Figure 2:
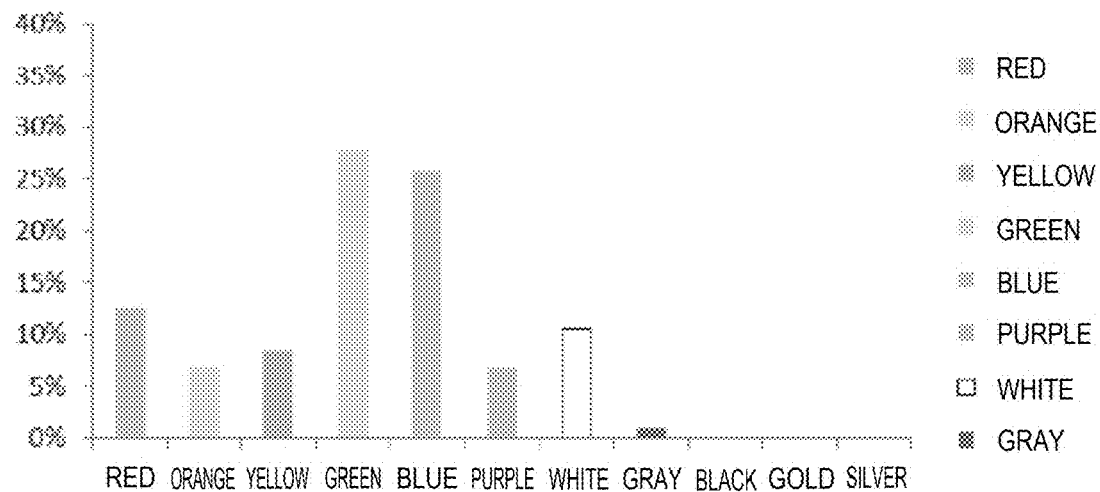
FIG. 2 is an example of a graph that illustrates relationships between a range including at least a first system of the color sample group, and values, obtained by converting the sums of values corresponding to contribution degrees to rates and summing those converted values for each type of the first system.

In the first mode of the color expression drawing of the present invention, when values, obtained by converting the sums of values that correspond to the contribution degrees to rates, are further summed for each type of the first system (A2), a value obtained by dividing this n (=n×100%) by n is used as the summed value. That is, 1 (=100%) is used as the summed value. FIG. 2 illustrates a graph for (A2) in which the first system of A kinds of color samples is hues. FIG. 2 is an example of a graph that illustrates relationships between a range including at least a first system of the color sample group, and values, obtained by converting the sums of values corresponding to contribution degrees to rates and summing those converted values for each type of the first system. Six kinds of hues as the first system and the five other types/kinds as the third system are set on the horizontal axis of FIG. 2. Regarding the vertical axis of FIG. 2, the height of the bar graph of "Red" on the horizontal axis, for example, represents a value obtained by summing values for all five kinds of tones.

Here, the values are obtained by converting, to a rate, the sums of values that correspond to the contribution degrees of the color samples of the red hue or converting, to a rate, the sums of values that correspond to the contribution degrees of the color samples of the red hue of each of the five tones (pale, light, vivid, deep, and dark). The result of summing the heights of the bar graphs that correspond to the 11 types/kinds on the horizontal axis is 1 (=100%).

Figure 3:
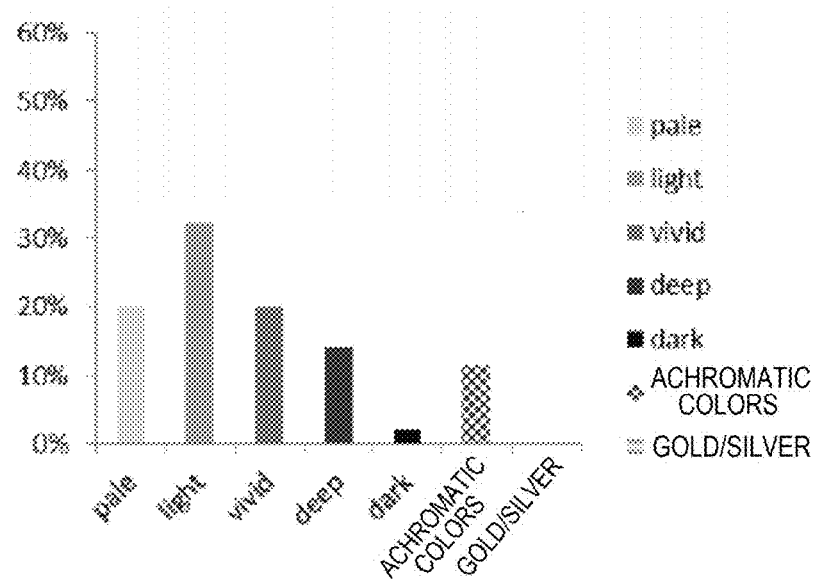
FIG. 3 is another example of a graph that illustrates relationships between a range including at least a first system of the color sample group, and values, obtained by converting the sums of values corresponding to contribution degrees to rates and summing those converted values for each type of the first system.

As illustrated in FIG. 3, the color expression drawing may be created using the five kinds of tones as the first system and a third system including two kinds as the horizontal axis.

Second Mode

The second mode of the color expression drawing of the present invention is a color arrangement table in which each color is arranged in the same arrangement as the color sample group; wherein a portion corresponding to each color of the color arrangement table includes a pallet(s); and (B1) the pallet is expressed using the sum of the values that correspond to the contribution degrees of each color, or a value obtained by converting, to a rate, the sum of the values that correspond to the contribution degrees of each color, or (B2) the pallets include the number of steps determined by converting, to a rate, the sum of the values that correspond to the contribution degrees of each color, and standardizing for each predetermined range of the rate.

In particular, with the second mode of the color expression drawing, it is preferable that the pallet includes the number of steps determined by converting the sum of the values that correspond to the contribution degrees of each color to a rate, and standardizing for each predetermined range of the rate (B2). The quantities of the contribution degrees (voting rates) are expressed by the number of steps of the pallet and, as such, the image can be visualized such that the image can be more intuitively shared with other people.

The preferable mode of the color arrangement table, in which each color is arranged in the same arrangement as the color sample group in the second mode of the color expression drawing, is the same as the preferable mode of the color sample group of the method for expressing an image with colors of the present invention. For example, in the color sample group illustrated in FIG. 1, the pallet that corresponds to the value found by (B1) is expressed, or the pallet with the number of steps determined by (B2) is expressed at a position that corresponds to each color sample.

In the second mode of the color expression drawing, it is preferable that the shape of the pallet is circular or is a polygonal shape with at least three sides. In the second mode of the color expression drawing, it is more preferable that the shape of the pallet is a polygonal shape with at least three sides, and even more preferable that the shape of the pallet is a rectangular shape.

Here, with the color expression drawing created by the method for expressing an image with colors of the present invention, in the color expression drawings obtained by summing the expression charts of the n subject(s) obtained in the third step, the sums of the contribution degrees given to all of the color samples are n (=n×100%).

In the second mode of the color expression drawing of the present invention, when the pallet is expressed using the sum of the values that correspond to the contribution degrees of the color samples or a value obtained by converting, to a rate, the sum of the values that correspond to the contribution degrees of the color samples (B1), a value obtained by dividing this n (=n×100%) by n is used as the summed value. That is, 1 (=100%) is used as the summed value. That is, the sum of the values given to the various color samples is 1 (=100%).

Figure 4:
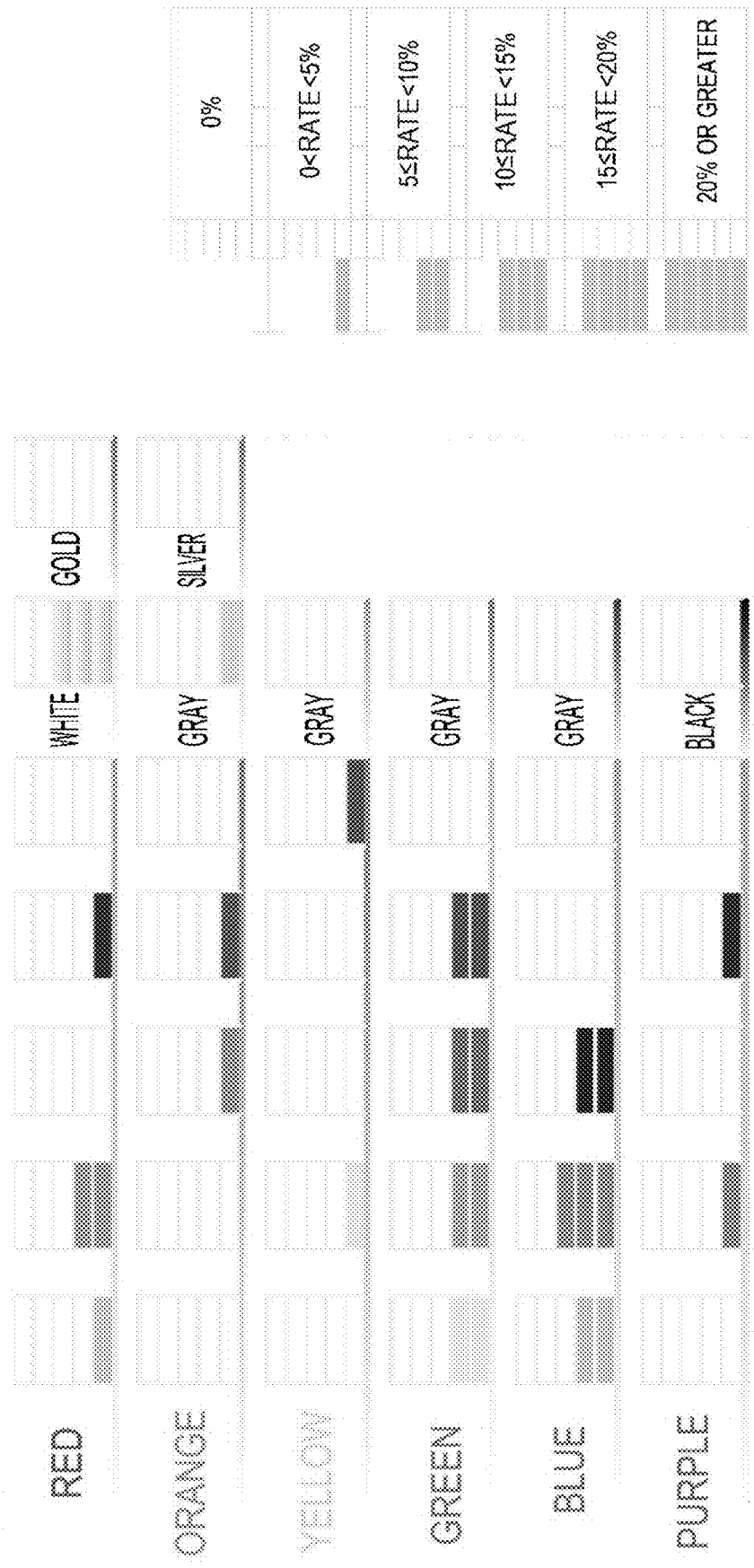
FIG. 4 is an example of a color expression drawing that is a color arrangement table in which each color is arranged in the same arrangement as in the color sample group.

In the second mode of the color expression drawing of the present invention, when the pallet includes the number of steps determined by converting, to a rate, the sum of the values that correspond to the contribution degrees of the color samples, and standardizing for each predetermined range of the rate (B2), the value given to each color sample is standardized. Any standard may be used for the standardization. For example, the standard may be one step per 3%, one step per 5%, or one step per 10%. Furthermore, in order to sharpen the features of the color expression drawing, pallets of colors that have rates below a certain threshold value may be omitted from the color expression drawing. FIG. 4 illustrates a color arrangement table for a case in which the pallet includes the number of steps determined by converting, to a rate, the sum of the values that correspond to the contribution degrees of each color, and standardizing for each predetermined range of the rate (B2). FIG. 4 is an example of a color expression drawing that is a color arrangement table in which each color is arranged in the same arrangement as the color sample group. In FIG. 4, the rates are expressed as one step of a pallet per 5%.

Third Mode

The third mode of the color expression drawing of the present invention is a rose diagram that includes a polygonal core with at least A sides. The sides of the core correspond to the A kinds of the first system of the color sample group.

The pallets of all of the colors belonging to the first system are arranged in directions substantially parallel to each sides of the polygon. Here, each side of the polygon corresponds to one of the A kinds of the first system.

The steps of each of The pallets are stacked and arranged on extending lines radiating from the inside of the core.

The number of steps of the pallet of each color is determined by converting, to a rate, the sum of the values that correspond to the contribution degrees of the color samples, and standardizing for each predetermined range of the rate.

The term "rose diagram" means a diagram that includes a core and pallets that are arranged around the core. "Rose diagram" is an expression that is formally used to facilitate comprehension of the shape of the color expression drawing. The term "rose diagram" should not be construed as limiting the shape of the color expression drawing of the present invention in any way.

Each of the pallets being arranged in directions substantially parallel to each of the sides means that, when a pallets is arranged, the angle formed between the extending line radiating from the inside of the core where the pallets is arranged and the side is substantially parallel+90° (substantially perpendicular). The angle formed between the direction substantially parallel to each side and that side is preferably ±20°, more preferably ±10°, even more preferably ±5°, and even more specially preferably ±1°.

When the pallets is rectangular, the angle formed between one side of pallets and each side is preferably ±20°, more preferably ±10°, even more preferably ±5°, and even more specially preferably ±1°.

In the third mode of the color expression drawing, the core preferably is implemented as a polygonal core with A+c sides that includes sides that correspond to the A kinds of the first system and c kind(s) of the third system of the color sample group.

In one example, A=six kinds of hues, and c=two kinds of systems (metallic colors and achromatic colors).

In the third mode of the color expression drawing, a blank field can be provided inside the core. A description of the color expression drawing may be written inside the core. Examples of the description written inside the core include the visualized image (smell material of the visualized scent, the visualized text string, or the like). Another example of the description written inside the core is the number of subjects. In the third mode of the color expression drawing, writing the visualized image inside the core is preferable because doing so enables the visualization of the image such that the image can be more intuitively shared with other people.

In the third mode of the color expression drawing, it is preferable that the shape of the pallet is circular or a polygonal shape with at least three sides. In the third mode of the color expression drawing, it is more preferable that the shape of the pallet is a polygonal shape with at least three sides, and even more preferable that the shape of the pallet is a rectangular shape.

A preferable number of steps of the pallet used in the third mode of the color expression drawing is the same as the preferable number of steps of the pallet used in the second mode of the color expression drawing.

Figure 5:
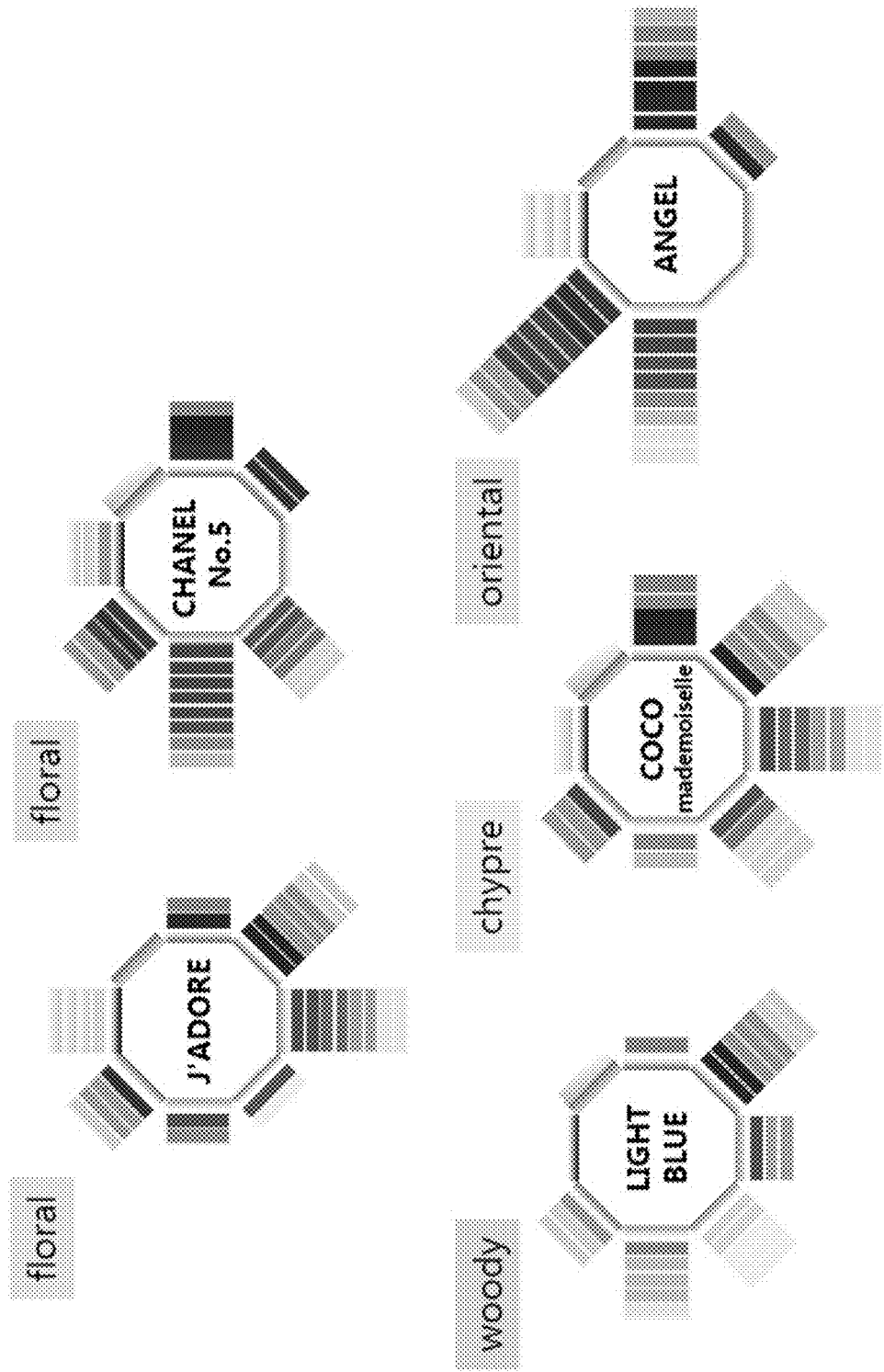
FIG. 5 is an example, created in Example 1, of color expression drawings, namely rose diagrams, for five types of perfumes.

FIG. 5 illustrates a preferable example of the third mode of the color expression drawing of the present invention. FIG. 5 is an example of a rose diagram in which rectangular pallets, which have numbers of steps that correspond to the selection rates, are arranged stacked on extending lines radiating from the inside of a polygonal core.

Figure 23C:
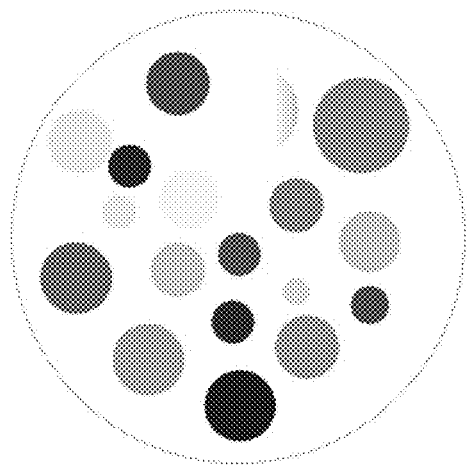
FIG. 23C is an example of a rose diagram in which circular color pallets, which have areas corresponding to the selection rates, are randomly arranged.
Figure 23B:
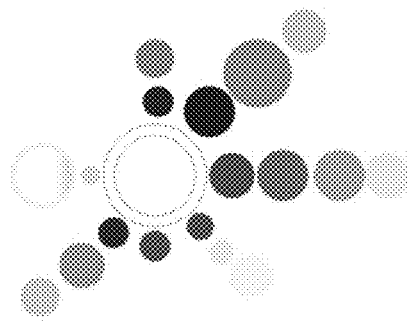
FIG. 23B is an example of a rose diagram in which circular pallets, which have areas corresponding to the selection rates, are arranged on extending lines radiating from inside a circular core.
Figure 23A:
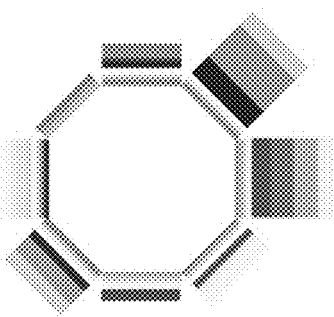
FIG. 23A is an example of a rose diagram in which rectangular pallets, which have sizes corresponding to the selection rates, are arranged stacked on extending lines radiating from inside a polygonal core.

FIG. 23A illustrates a preferable example of the third mode of the color expression drawing of the present invention. FIG. 23A is an example of a rose diagram in which rectangular pallets, which have sizes (areas) corresponding to the selection rates, are arranged stacked on extending lines radiating from the inside of a polygonal core Fourth Mode The forth mode of the color expression drawing of the present invention is a rose diagram that includes a polygonal core with at least A sides (where A≥2).

The pallets are arranged in directions substantially parallel to the sides of the polygon.

The steps of the pallets are stacked and arranged on extending lines radiating from the inside of the core.

Preferable ranges of the fourth mode of the color expression drawing of the present invention are the same as the preferable ranges of the third mode of the color expression drawing of the present invention.

Other Modes

Examples of other modes of the color expression drawing of the present invention include rose diagrams that are modified examples of the third mode. Specific examples include the rose diagrams illustrated in FIGS. 23B and 23C. FIG. 23B is an example of a rose diagram in which circular pallets, which have areas corresponding to the selection rates, are arranged on extending lines radiating from inside a circular core. FIG. 23C is an example of a rose diagram in which circular pallets, which have areas corresponding to the selection rates, are randomly arranged.

Figure 26:
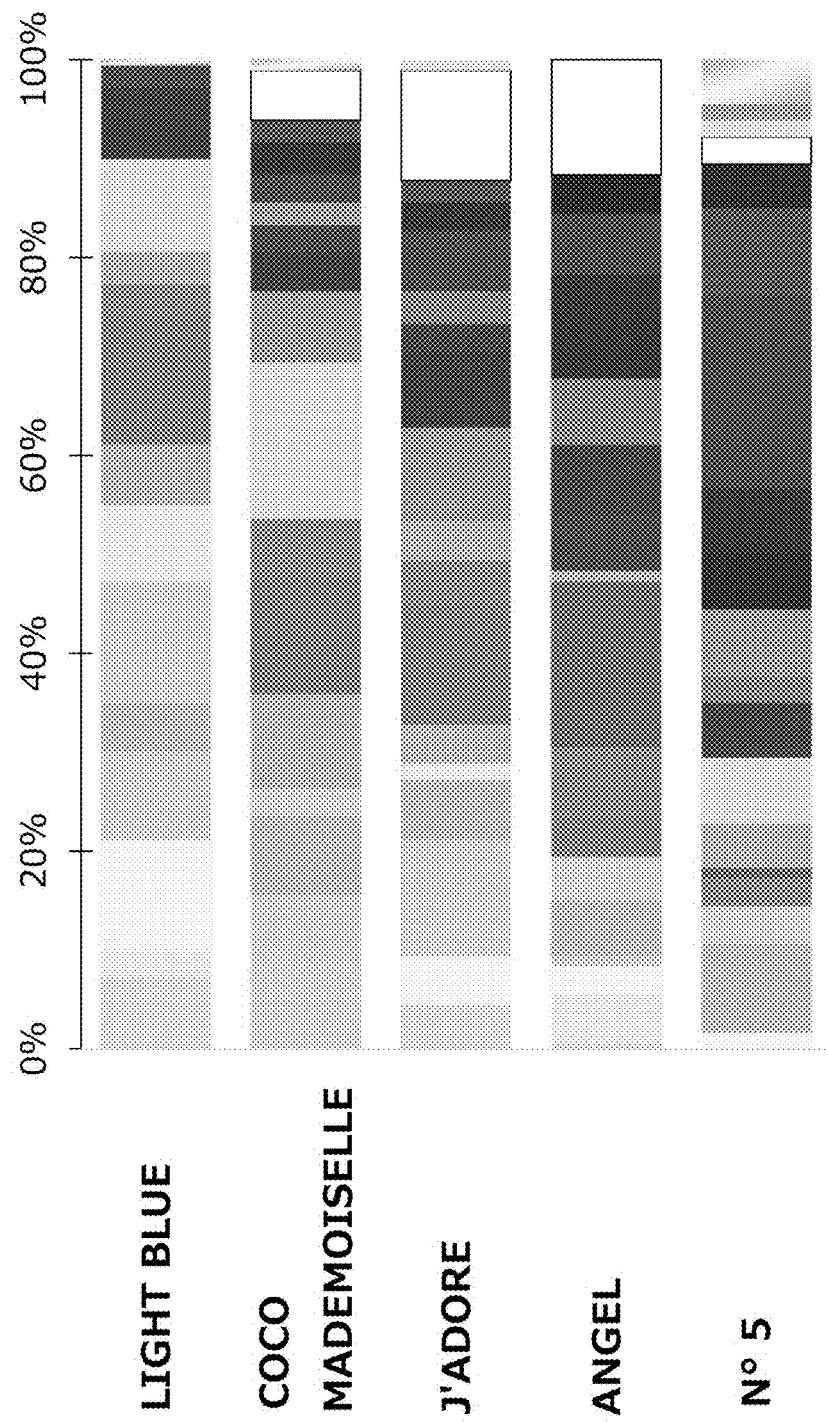
FIG. 26 is an example of a color expression drawing, created in Example 1, in which visualization is carried out without standardizing the selection rate of each color sample.

Examples of other modes include graphs expressed by rates calculated from the contribution degrees, without standardizing the selected colors. In one example, the selection rate of each color sample is expressed as a bar graph (a 100% stacked horizontal bar graph, or the like). This color expression drawing is visualized by applying colors, which are the same as the color samples, to each element of the bar graph without standardizing the selection rate of each color sample (see FIG. 26). In FIG. 26, the width of each element of the bar graph corresponds to the selection rate of each color sample, and the color of each element of the bar graph corresponds to each color sample. As such, the selection rate of each color can be easily ascertained.

Set

The set of the present invention includes the color expression drawing of the present invention and a scent to be visualized.

The set includes the color expression drawing of the present invention and the scent to be visualized and, as such, the image can be visualized such that the image can be more intuitively shared with other people.

As a result of providing the set that includes the color expression drawing obtained by visualizing the image of the scent and the visualized scent, the image of the scent can be shared with people other than the subject(s).

Note that sets can be configured that include an object other than the scent. That is, the set may include the color expression drawing of the present invention and a text or a person to be visualized.

Method for Expressing a Scent

The method for expressing a scent of the present invention includes a fourth step in which an evaluator that has smelled the scent included in the set of the present invention expresses an image to which the scent is to be changed using the colors included in the color expression drawing.

The evaluator (person other than the subject(s)) that has smelled the scent included in the set of the present invention performs the method for expressing a scent in which the image to which the scent is to be changed is expressed using the colors included in the color expression drawing. As such, the image in which the scent is to be changed can be shared with people other than the evaluator.

Examples of the people other than the evaluator include perfumers (or flavorist).

Fourth Step

In the fourth step, the evaluator that has smelled the scent included in the set of the present invention expresses an image to which the scent is to be changed using the colors included in the color expression drawing. A specific example of a method of expressing the image to which the scent is to be changed using the colors included in the color expression drawing is expressing a desire to increase or decrease, one step, a desired color that is included in the color expression drawing. Furthermore, it is preferable that the evaluator specifically creates a color expression drawing of the image to which the scent is to be changed.

When the evaluator that has smelled the scent included in the set of the present invention desires to express the image to which the scent is to be changed using colors not included in the color expression drawing, it is preferable that the evaluator expresses those colors that are not included in the color expression drawing using colors included in the color sample group.

Preferable modes of the color sample group used in the fourth step are the same as the preferable modes of the color sample group used in the first step of the method for expressing an image with colors of the present invention.

Note that, when the evaluator, who has smelled the scent included in the set of the present invention, desires to express the image to which the scent is to be changed by a method other than colors (for example, words), the examiner may also express by a method other than the colors.

Method for Compounding a Scent

The method for compounding a scent of the present invention includes:

a fifth step in which a new scent to be visualized is compounded;

a sixth step in which the new scent to be visualized is expressed by the method for expressing an image with colors of the present invention; and a seventh step in which similarity is confirmed between a color expression drawing of an image to which the scent is to be changed, expressed by an evaluator using the method for expressing a scent of the present invention, and the color expression drawing expressed in the sixth step.

In particular, after the method for expressing a scent of the present invention in which the evaluator performs an evaluation, a person other than the evaluator compounds a new scent to be visualized. Then, the new scent to be visualized is expressed by a color expression drawing, and the similarity between the color expression drawings of the image to which the scent is to be changed expressed by the evaluator and the color expression drawing of the new scent to be visualized is confirmed. As a result, it is easier to compound a new scent that is more likely to match the image of the direction in which the evaluator desires to change the scent.

Fifth Step

The method used to compound the new scent to be visualized in the fifth step is not particularly limited, and any known method may be used.

Sixth Step

Preferable modes of the sixth step are the same as the preferable modes of the method for expressing an image with colors of the present invention.

Seventh Step

In the seventh step, the similarity is confirmed between the color expression drawings of the image to which the scent is to be changed, expressed by the evaluator using the method for expressing a scent of the present invention, and the color expression drawing expressed in the sixth step.

In general, the method for confirming the similarity between one color expression drawing and another color expression drawing is not particularly limited. For example, the method for evaluating similarity between images of the present invention (described later) can be used.

When, for example, in the method for expressing a scent of the present invention, the evaluator has specifically created a color expression drawing of the image to which the scent is to be changed, that color expression drawing can be used as the color expression drawing of the image to which the scent is to be changed expressed by the evaluator using the method for expressing a scent of the present invention. When, in the method for expressing a scent of the present invention, the evaluator has not specifically created a color expression drawing of the image to which the scent is to be changed, a perfumer carrying out the method for compounding a scent of the present invention may create the color expression drawing of the image to which the scent is to be changed desired by the evaluator.

Method for Determining a Color

The method for determining a color of the present invention determines, in correspondence with the colors included in the color expression drawing of the present invention, the color of a fragrance that provides a scent to be visualized, the color of a flavored product to which a flavor that provides the scent to be visualized is added, or the color of a packaging of a fragrance or a flavored product.

For example, the color of the packaging of a cosmetic (perfume, shampoo, body soap, or the like) or a flavored product such as a food can be determined using the colors obtained by visualizing the image of the scent.

Method for Evaluating Similarity Between Images

The method for evaluating similarity between images of the present invention includes a step in which similarity is confirmed between at least two types of color expression drawings of the present invention.

The color expression drawings used in the method for evaluating similarity between images of the present invention may be color expression drawings of the same type of image or color expression drawings of different types of images.

In one example, it is possible to use a color expression drawing of an image of a scent of a first smell material and a color expression drawing of an image of a scent of a second smell material, and evaluate the similarity between these two images. In a case in which the first smell material is evaluated, the first smell material is slightly adjusted according to the desire of the evaluator, thereby resulting in the second smell material, and this second smell material is evaluated, slight differences in the scents can be expressed as the similarity between the images.

Moreover, it is possible to use a color expression drawing of an image of a scent of the first smell material and a color expression drawing of an image of a text (word) about the scent, and evaluate the similarity between these two images. Note that the image of the text (word) varies from person to person. In the method for evaluating similarity between images of the present invention, the image of the scent is converted to a color expression drawing, the image of the text is converted to a color expression drawing, and the two color expression drawings are compared. As such, expression using the images of the text (word) and the scent is possible, which is more objective than directly expressing the scent with text (word). The text or word used in such a case is not particularly limited. The text or word may be expressed in the Japanese language using hiragana, katakana, kanji, romanizations, or other characters, or may be expressed in a foreign language using characters used in foreign languages (for example, the text or word may be expressed in the Korean Language using Hangul).

In the method for evaluating similarity between images of the present invention, when the color expression drawings are color arrangement tables in which each color is arranged in the same arrangement as the color sample group; and a portion corresponding to each color of the color arrangement table includes a pallet;

it is preferable that the similarity between the color expression drawings is determined on the basis of (C1) a correlation coefficient or a pattern similarity that uses a sum of values that correspond to a contribution degree of each color expressed by the pallet, or a value obtained by converting, to a rate, a sum of the values that correspond to the contribution degrees of each color, or (C2) a correlation coefficient or a pattern similarity that uses the number of steps obtained by converting, to a rate, the sum of the values that correspond to the contribution degrees of each color of the pallet, and standardizing for each predetermined range of the rate.

When "the sum of the values that correspond to the contribution degrees of each color expressed by the pallet, or the value obtained by converting, to a rate, the sum of the values that correspond to the contribution degrees of each color" is known, it is preferable that the similarity between the color expression drawings is determined on the basis of "a correlation coefficient or a pattern similarity that uses the sum of values that correspond to the contribution degrees of each color expressed by the pallet, or a value obtained by converting, to a rate, the sum of the values that correspond to the contribution degrees of each color" (C1).

Meanwhile, when "the sum of the values that correspond to the contribution degrees of each color expressed by the pallet, or value obtained by converting, to a rate, the sum of the values that correspond to the contribution degrees of each color" is unknown, it is preferable that the similarity between the color expression drawings is determined on the basis of "a correlation coefficient or a pattern similarity that uses the number of steps obtained by converting, to a rate, the sum of the values that correspond to the contribution degrees of each color of the pallet, and standardizing for each predetermined range of the rate" (C2). In this case, a range of pattern similarity (described later) may be obtained by reverse calculating a range of "the sum of the values that correspond to the contribution degrees of each color expressed by the pallet, or the value obtained by converting, to a rate, the sum of the values that correspond to the contribution degrees of each colors" from the "number of steps obtained by converting, to a rate, the sum of the values that correspond to the contribution degrees of each color of the pallet, and standardizing for each predetermined range of the rate" (C2).

Note that, when the color expression drawings are rose diagrams, as in cases in which "the sum of the values that correspond to the contribution degrees of each color expressed by the pallet, or the value obtained by converting, to a rate, the sum of the values that correspond to the contribution degrees of each colors" is unknown, the range of pattern similarity (described later) may be obtained by reverse calculating a range of "the sum of the values that correspond to the contribution degrees of each color expressed by the pallet, or the value obtained by converting, to a rate, the sum of the values that correspond to the contribution degrees of each colors" from the number of steps of the pallet of the rose diagram.

The correlation coefficient can be calculated by a known method. For example, a correlation coefficient R (or $R^2$) can be calculated by the least squares method or spreadsheet software using the average and standard deviation of the contribution degree for each color sample. Instead of the contribution degree for each color sample, the sum of the contribution degrees for each hue and/or the sum of the contribution degrees for each tone may be used. The similarity increases the closer the correlation coefficient R is to 1.

The pattern similarity can be obtained by the following method, which is described in "Pattern Similarity and Applications Thereof—Pattern Analysis in Food Science", S. Tamura, T. Suzuki, and T. Matsunaga, Nippon Shokuhin Kogyo Gakkai Vol. 32, No. 11, 847-856 (1985).

Method for Measuring Pattern Similarity

Two numeric groups consisting of numerical values of n measurement terms, namely pattern A ($a_1, a_2, \ldots, a_n$) and pattern B ($b_1, b_2, \ldots, b_n$), being the same pattern means that $$a_1:a_2:\ldots:a_n = b_1:b_2:\ldots:b_n$$

Accordingly, it is clear that, when the numeric group A and the numerical group B are considered as component representations of position vectors $$\vec{OA}, \vec{OB}$$

in n-dimensional space with O as the origin, the directions (including the orientations) of the vector $$\vec{OA}$$

and the vector $$\vec{OB}$$

will match.

When the numeric group patterns A and B match, it is thought that the directions of the vectors $$\vec{OA} \text{ AND } \vec{OB}$$

will match and, if the difference between the patterns is large, the angle θ formed by $$\vec{OA} \text{ AND } \vec{OB}$$

will be large. Therefore, the similarity or heterogeneity between the patterns can be calculated as a numerical value using the angle θ formed by $$\vec{OA} \text{ AND } \vec{OB}$$

or a function thereof. The pattern similarity is represented by cos θ.

The pattern similarity between pattern A ($a_1, a_2, \ldots, a_n$) and pattern B ($b_1, b_2, \ldots, b_n$) is notated as $S_{(A,B)}$. Based on the formula of the dot product of the vectors $$(\vec{OA}, \vec{OB}) = |\vec{OA}||\vec{OB}| \cos\theta = \sum_{i=1}^{n} a_i b_i$$

becomes $$S_{(A,B)} = \cos\theta = \frac{(\overrightarrow{OA}, \overrightarrow{OB})}{|\overrightarrow{OA}||\overrightarrow{OB}|}$$

$$= \frac{\sum_{i=1}^{n} a_i b_i}{\sqrt{\sum_{i=1}^{n} a_i^2} \sqrt{\sum_{i=1}^{n} b_i^2}}$$

When the patterns are the same, θ=0. Therefore, the pattern similarity in this case is $S_{(A,B)}$=COS 0°=1

Moreover, when A and B do not include any shared components θ=90°. Therefore, the pattern similarity in this case is $S_{(A,B)}$=COS 90°=0

The pattern similarity becomes a numerical value between 1 and 0. As the similarity between the patterns increases, the numerical value becomes closer to 1, such as 0.999. Thus, the numerical value is intuitive and easy to understand.

In the present invention, a configuration is possible in which the patterns are determined to be somewhat similar when the pattern similarity cos θ is greater than 0.3 and less than or equal to 0.5, similar when greater than 0.5 and less than 0.71, and very similar when greater than or equal to 0.71.

EXAMPLES

Hereinafter, the present invention is described in detail using examples and comparative examples. The materials, amounts, rates, processing details, processing procedures, and the like can be appropriately modified without departing from the spirit of the present invention. Accordingly, the scope of the present invention should not be construed as being limited to the specific examples described below.

Example 1

Visualization of Image of Scent
Scent

Using the following five types of perfumes popular in France and the United States as the smell material, the image of each scent was visualized. The scent tone of each perfume is indicated in the parentheses.
(1) J'ADORE (Floral)
(2) CHANEL No. 5 (Floral)
(3) LIGHT BLUE (Woody)
(4) COCO mademoiselle (Chypre)
(5) ANGEL (Oriental)
Evaluation Method
Color Samples Colors were selected from the color system called PCCS, developed by the Japan Color Research Institute. The main purpose of PCCS is color harmonization. A total of 38 colors, including 30 colors of six kinds of hues (red, orange, yellow, green, blue, and purple) and five kinds of tones (color tones; combined concept of lightness and saturation), six achromatic colors, and gold and silver were set as selection colors. Here, the gold and the silver constitute the third system (metallic colors) related to color texture. Using PCCS, the selection colors were arranged in a hue-tone two-dimensional array, thereby facilitating comparisons of the scents based on the arrangement of the colors and making the features of the scents easier to ascertain.

A color sample group including a total of 38 types of color samples was prepared. Specifically, the color sample group included 30 types of color samples consisting of A=6 kinds of hues (red, orange, yellow, green, blue, and purple) as the first system and B=5 kinds of tones (pale, light, vivid, deep, and dark) as the second system, and color samples consisting of 6 types of achromatic colors (white, four shades of gray, and black) and 2 types of metallic colors (gold and silver) as the third system. The achromatic colors and the metallic colors were also arranged on the hue-tone two-dimensional array. As a result, comparisons of the scents based on the arrangement of the colors were facilitated and the features of the scents was easier to ascertain. The first system and the second system were exemplarily determined. As desired, color expression drawings may be created with the tones as the first system and the hues as the second system.

FIG. 1 illustrates a schematic diagram of the color sample group used in Example 1. In FIG. 1, a number is assigned to each color sample.

In FIG. 1:
11, 21, 31, 41, and 51 are color samples that correspond to pale, light, vivid, deep, and dark when the hue is red;
12, 22, 32, 42, and 52 are color samples that correspond to pale, light, vivid, deep, and dark when the hue is orange;
13, 23, 33, 43, and 53 are color samples that correspond to pale, light, vivid, deep, and dark when the hue is yellow;
14, 24, 34, 44, and 54 are color samples that correspond to pale, light, vivid, deep, and dark when the hue is green;
15, 25, 35, 45, and 55 are color samples that correspond to pale, light, vivid, deep, and dark when the hue is blue;
16, 26, 36, 46, and 56 are color samples that correspond to pale, light, vivid, deep, and dark when the hue is purple;
61 to 66 are color samples that correspond to white, four shades of gray, and black as achromatic colors; and
71 and 72 are color samples that correspond to gold and silver as metallic colors.
First Step Eighteen (n=18) subjects were selected, and each subject was made to select two colors.

One subject was shown the color sample group illustrated in FIG. 1 and made to smell the five types of scents. Then, the subject was made to select, from the color sample group, the S=2 types of color samples that matched each scent and also was made to assign contribution degrees $p_1$ and $p_2$ (unit: percentage) for each selected color sample. In the evaluations, a set amount of perfume was applied to a predetermined smell evaluation card.
Second Step A pivot table including 38 fields corresponding to the 38 types of color samples of the color sample group was created on the basis of the color samples and the contribution degrees selected and assigned by the one subject. The assigned contribution degree of each color sample was calculated in each corresponding field.
Third Step The remaining 17 subjects also performed the first step in the manner described above.

Here, as the second step, a pivot table including 38 fields corresponding to the 38 types of color samples of the color sample group was created for all of the subjects. The assigned contribution degree of each color sample was calculated in each corresponding field.

The sum of the contribution degrees of each color sample in the resulting pivot table was divided by the sum of the contribution degrees of all of the subjects (18 subjects×

100%=1800). The resulting value was converted into the selection rate of each color sample.

Color Expression Drawing Visualizing the Selection Rate of Each Color Sample, Color Expression Drawing in which the Hues are Displayed in One-Dimension, and Color Expression Drawing in which the Tones are Displayed in One-Dimension The selection rate of each color sample is expressed as a bar graph (a 100% stacked horizontal bar graph). This color expression drawing is visualized without standardizing the selection rate of each color sample, by applying colors, which are the same as the color samples, to each element of the bar graph. FIG. 26 illustrates a color expression drawing in which the images of the scents of the five types of perfume are expressed by the 18 subjects in Example 1 using colors. Here, the visualization was carried out without standardizing the selection rate of each color sample.

With the first system as the "hue", the rate of each color sample was tallied in a range that includes the "hue." As a result, a color expression drawing was obtained in which the hues are displayed in a one-dimensional manner. Specifically, a graph was created in which a range that includes the first system (hues), the achromatic colors, and the metallic colors of the color sample group is set on the horizontal axis, and values obtained by converting, to rates, the sums of values corresponding to the contribution degrees and summing those converted values for each type of the first system, are set on the vertical axis (A2). FIG. 2 illustrates a color expression drawing in which the image of the scent of J'ADORE by the 18 subjects in Example 1 is expressed using colors. In this color expression drawing, the hues are displayed in a one-dimensional manner.

Likewise, with the first system as the "tone", the rate of each color sample was tallied in a range that includes the "tone." As a result, a color expression drawing was obtained in which the tones are displayed in a one-dimensional manner. Specifically, a graph was created in which a range that includes the first system (tones), the achromatic colors, and the metallic colors of the color sample group is set on the horizontal axis, and values obtained by converting, to rates, the sums of values corresponding to the contribution degrees and summing those converted values for each type of the first system, are set on the vertical axis (A2). FIG. 3 illustrates a color expression drawing in which the image of the scent of J'ADORE by the 18 subjects in Example 1 are expressed using colors. In the color expression drawing, the tones are displayed in a one-dimensional manner.

With these color expression drawings, it is possible to perform a scent comparison that is focused on one type of system, such as the hues or the tones.

Creation of Color Expression Drawing in which Each Color is Arranged in the Same Arrangement as the Color Sample Group A color expression drawing was created, namely a color arrangement table, in which each color is arranged in a same arrangement as a color sample group, wherein portions that correspond to each color of the color arrangement table include a pallet; and the pallet includes the number of steps determined by converting, to a rate, a sum of values that correspond to contribution degrees of each color, and standardizing for each predetermined range of the rate (B2).

The number of steps of the pallet was determined in accordance with the selection rate of each color as found by pivot table analysis. In this example, the number of steps is divided every 5%. Specifically, 0% is 0 steps, from 0% to less than 5% is one step, from 5% to less than 10% is two steps, from 10% to less than 15% is three steps, from 15% to less than 20% is four steps, and 20% or greater is five steps.

As with the color samples, the hues (red, orange, yellow, green, blue, and purple) are arranged on the vertical axis and the tones (p: pale, lt: light, v: vivid, dp: deep, and dk: dark) are arranged on the horizontal axis. The achromatic colors and the gold and silver were arranged as illustrated in FIG. 2.

For each smell material, the results were depicted as color expression drawings in which the number of steps of the pallet was determined in accordance with the calculated selection rate of each color sample.

FIG. 4 illustrates a color expression drawing in which the image of the scent of J'ADORE by the 18 subjects in Example 1 is expressed using colors. In the color expression drawing, each color is arranged in the same arrangement as the color sample group.

Creation of Rose Diagram Color Expression Drawing

A rose diagram color expression drawing was created that includes a polygonal core with at least A sides that correspond to A kinds of the first system of the color sample group. Pallets of all of the colors belonging to the first system are arranged in directions substantially parallel to the sides of the polygon that correspond to the A kinds of the first system; steps of each pallet are stacked and arranged on extending lines radiating from the inside of the core; and the number of steps of the pallet of each color is determined by converting, to a rate, the sum of values that correspond to contribution degrees of each color, and standardizing for each predetermined range of the rate.

First, the number of steps of the pallets determined in the creation of the color expression drawing, in which each color is arranged in the same arrangement as the color sample group, was used as the number of steps of the color palettes pallets of the rose diagram.

Next, the selection colors were divided into a total of 8 kinds including the A=6 kinds of hues, the achromatic colors, and the metallic colors. A regular octagon was used as the core of the rose diagram, and one of each of the hues (total of six sides), the achromatic colors (one side), and the metallic colors (one side) were assigned to each of the eight sides of the regular octagon.

The pallets of all of the colors belonging to each hue, the achromatic colors, and the metallic colors were expressed by being stacked, in order of tone darkness, in directions parallel to each of the eight sides of the regular octagon.

FIG. 5 illustrates rose diagram color expression drawings of the five types of perfume together with the scent tone of each perfume. In FIG. 5, when viewing the rose diagram color expression drawings on paper, the pallets are stacked, in counterclockwise order, in the following order: achromatic colors, red, orange (left side on paper), yellow, green (bottom side on paper), blue, purple (right side on paper), and metallic colors. Note that the order is the same for other rose diagrams in which the core is an octagon.

FIG. 5 was analyzed and the results were as follows:

(1) J'ADORE (Floral): For the tone, "light" was predominant, and green and blue were characteristic hues.

(2) CHANEL No. 5 (Floral): For the tone, "dark" was predominant, and red, orange, and yellow were characteristic hues.

(3) LIGHT BLUE (Woody): The lightest tones were selected for this perfume. The "light" tone was predominant, and the "dark" tone was not selected at all. The yellow and blue hues were predominant, and the achromatic colors were not selected at all. With this perfume, the hues were selected relatively uniformly, but there was a bias in the tones that were selected.

(4) COCO mademoiselle (Chypre): Comparing the rose diagrams (ART-Flower), this perfume was similar to LIGHT BLUE, but the tone was somewhat darker and the selection rate of the green hue was very high.

(5) ANGEL (Oriental): This perfume contrasted with LIGHT BLUE in that there was no bias in the tones of the selected colors. However, the hues were predominantly red, orange, and purple, and yellow and green hues were not selected.

Example 2

Influence of Number of Subjects: 5 Subjects

In this example, the number of the subjects was changed to 5. The same evaluation as in Example 1 was performed, and rose diagram color expression drawings were created.

Figure 6:
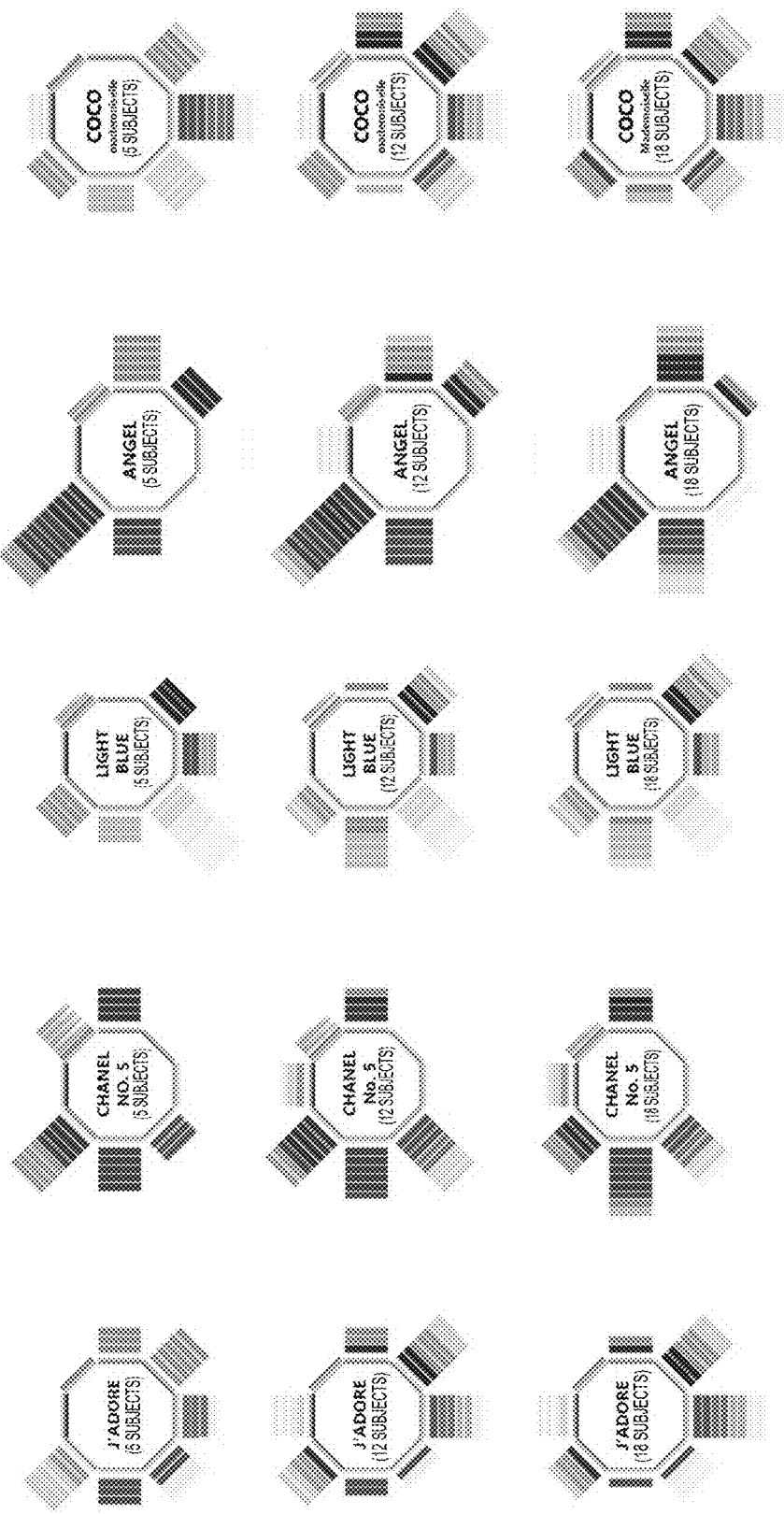
FIG. 6 is an example, created in Examples 1 to 3, of color expression drawings, namely rose diagrams, for five types of perfumes for comparing cases in which the number of subjects differs.

The obtained rose diagram color expression drawings are illustrated in the first row (on paper) of FIG. 6. In the first row of FIG. 6, the name of the scent material and the number of subjects (5 subjects) are indicated in the cores of the rose diagrams.

Example 3

Influence of Number of Subjects: 12 Subjects

In this example, the number of the subjects was changed to 12. The same evaluation as in Example 1 was performed, and rose diagrams color expression drawings were created.

The obtained rose diagram color expression drawings are illustrated in the second row (on paper) of FIG. 6. In the second row of FIG. 6, the name of the scent material and the number of subjects (12 subjects) are indicated in the cores of the rose diagrams.

From FIG. 6, it is clear that the pattern similarity between the rose diagrams when there are five subjects and the rose diagrams when there are 12 subjects, and the pattern similarity between the rose diagrams when there are five subjects and the rose diagrams when there are 18 subjects are somewhat high; and that there is a clear trend that corresponds to the type of the scent material. Accordingly, it is clear that, with the method for expressing an image with colors of the present invention, it is possible to visualize an image such that the visualization of the image of the scent has high reproducibility and the image can be intuitively shared with other people, even when the number of subjects is few (less than 10 subjects; for example, 5 subjects). In particular, it is thought that, with the method for expressing an image with colors of the present invention, the image can be visualized such that the visualization of the image of the scent has higher reproducibility and the image can be more intuitively shared with other people that in the method described in JP-A-2007-47503, even when the number of subjects is few (the pattern similarity with more objective cases where there are many subjects increases). Note that, in the method described in JP-A-2007-47503, the subjects select one color, but in the method for expressing an image with colors of the present invention, the subjects select two or more colors along with assigning the contribution degrees thereof. In addition, with the method for expressing an image with colors of the present invention, there is a benefit in that the subjectivity of the subjects (for example, the subject mainly desires to select pink, but also slightly desires to select black) can be reflected in the contribution degrees.

Furthermore, in Examples 1 to 3, it is clear that the pattern similarity is highest between the rose diagrams when there are 12 subjects and the rose diagrams when there are 18 subjects. As such, it is clear that it is preferable that the number of subjects is 10 or greater because, in such a case, the image can be visualized such that the reproducibility of the visualization of images of scents is higher and the image can be more intuitively shared with other people.

Note that the pattern similarity can be measured by the method described in an example that is described later.

Example 4

Visualization of Image of Text

Text

The following texts (A) to (F), for which appropriate tones of colors are set, were selected from the PCCS color system:

(A) White (bright): Clean (B) Pale and light (bright): Feminine, tender, cute, clear, refreshing, wholesome, cheerful (C) Vivid (brilliant): Ostentatious (D) Gray (medium tone): Gentle, soft, calm, cultured (shibui)

(E) Deep and dark (dark): Ripe, mature, masculine (F) Black (dark): High-class, formal, stylish Furthermore, the other words indicated in (G) were selected.

(G) Fresh, dignified, natural, pleasant, exciting, elegant, mellow, sharp, sweet, delicate, gorgeous An image of each text was visualized using the aforementioned 30 words consisting of 19 words related to the tones (color tones; combined concept of lightness and saturation) and the other 11 words.

The same color samples used in Example 1 were used.

With the exception of making the subjects select, from the color sample group, S=2 types of color samples that match the image of the viewed text and the contribution degrees (unit: percentage) of each of the color samples instead of the image of the scent of the smell material that the subjects smelled, the rose diagram color expression drawings were created in the same manner as in Example 1.

Figure 7:
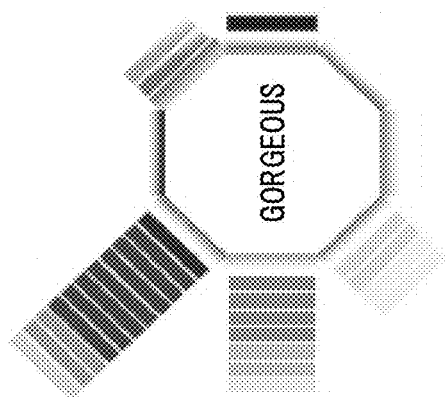
FIG. 7 is an example, created in Example 4, of a color expression drawing, namely a rose diagram, for the text "gorgeous"
Figure 8:
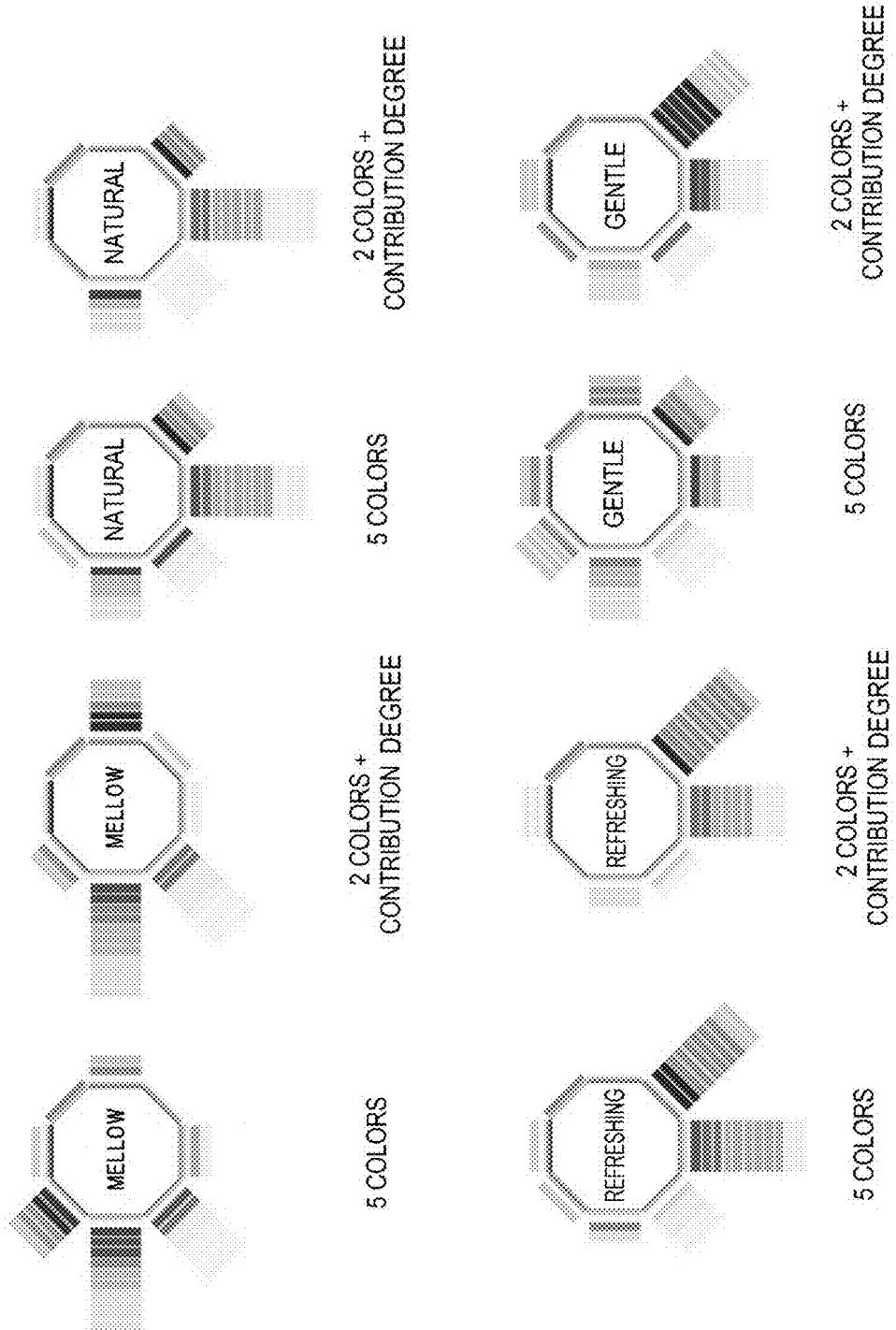
FIG. 8 is an example of rose diagram color expression drawings of text, created in Example 4 and Reference Example 1, for comparing cases in which the color samples and the contribution degrees selected and assigned by the subjects differ.
Figure 9:
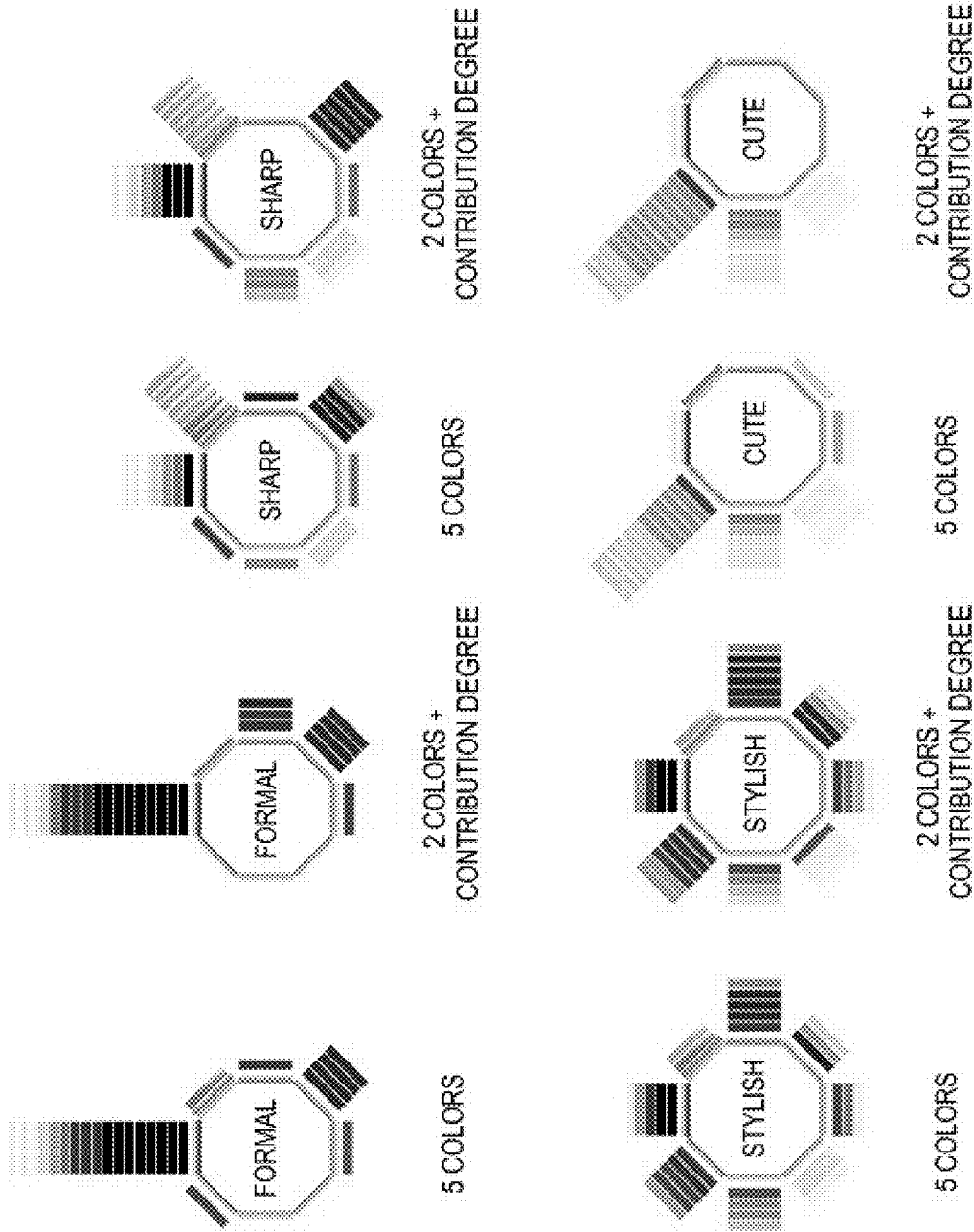
FIG. 9 is another example of rose diagram color expression drawings for text, created in Example 4 and Reference Example 1, for comparing cases in which the color samples and the contribution degrees selected and assigned by the subjects differ.
Figure 10:
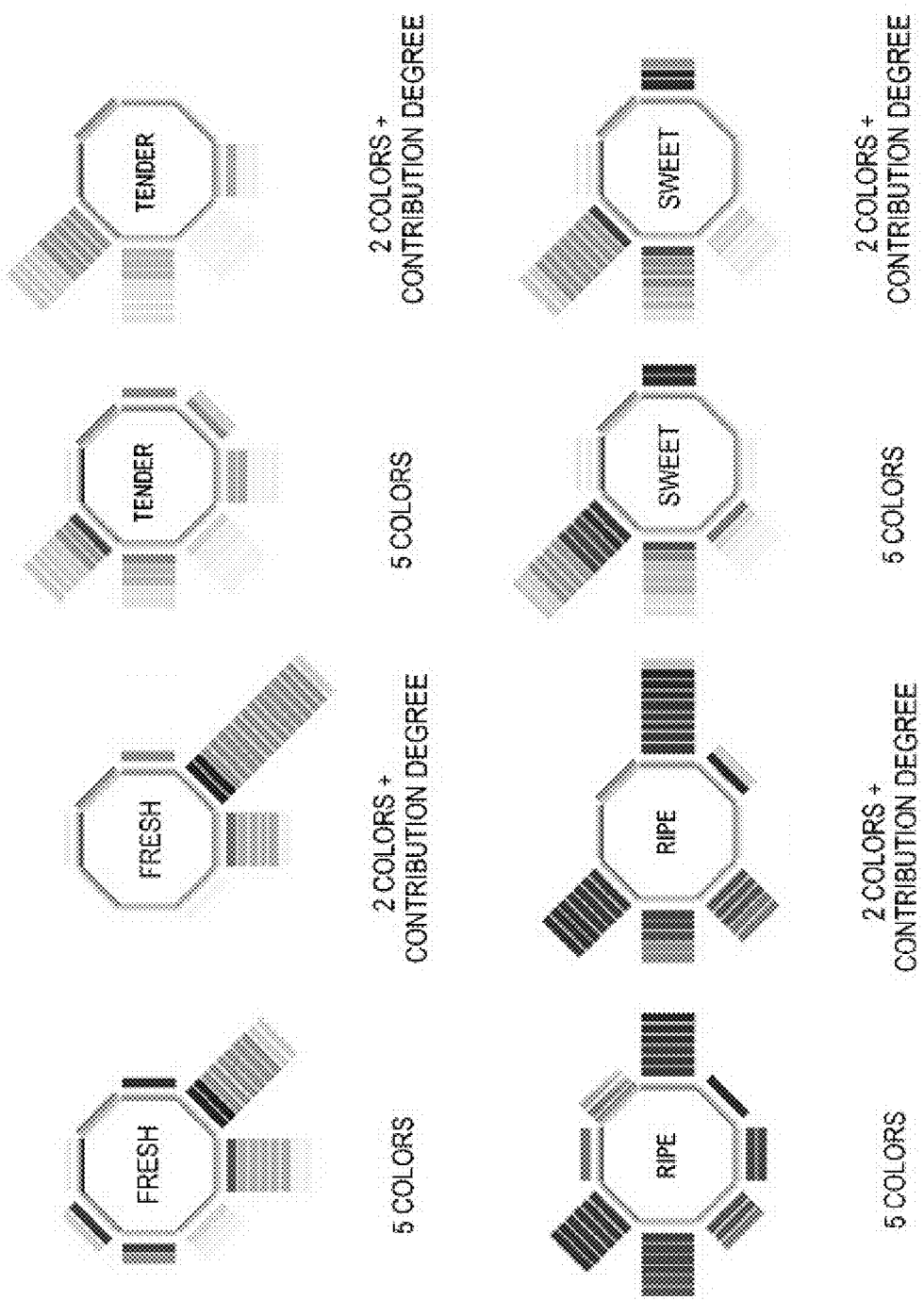
FIG. 10 is another example of rose diagram color expression drawings for text, created in Example 4 and Reference Example 1, for comparing cases in which the color samples and the contribution degrees selected and assigned by the subjects differ.
Figure 11:
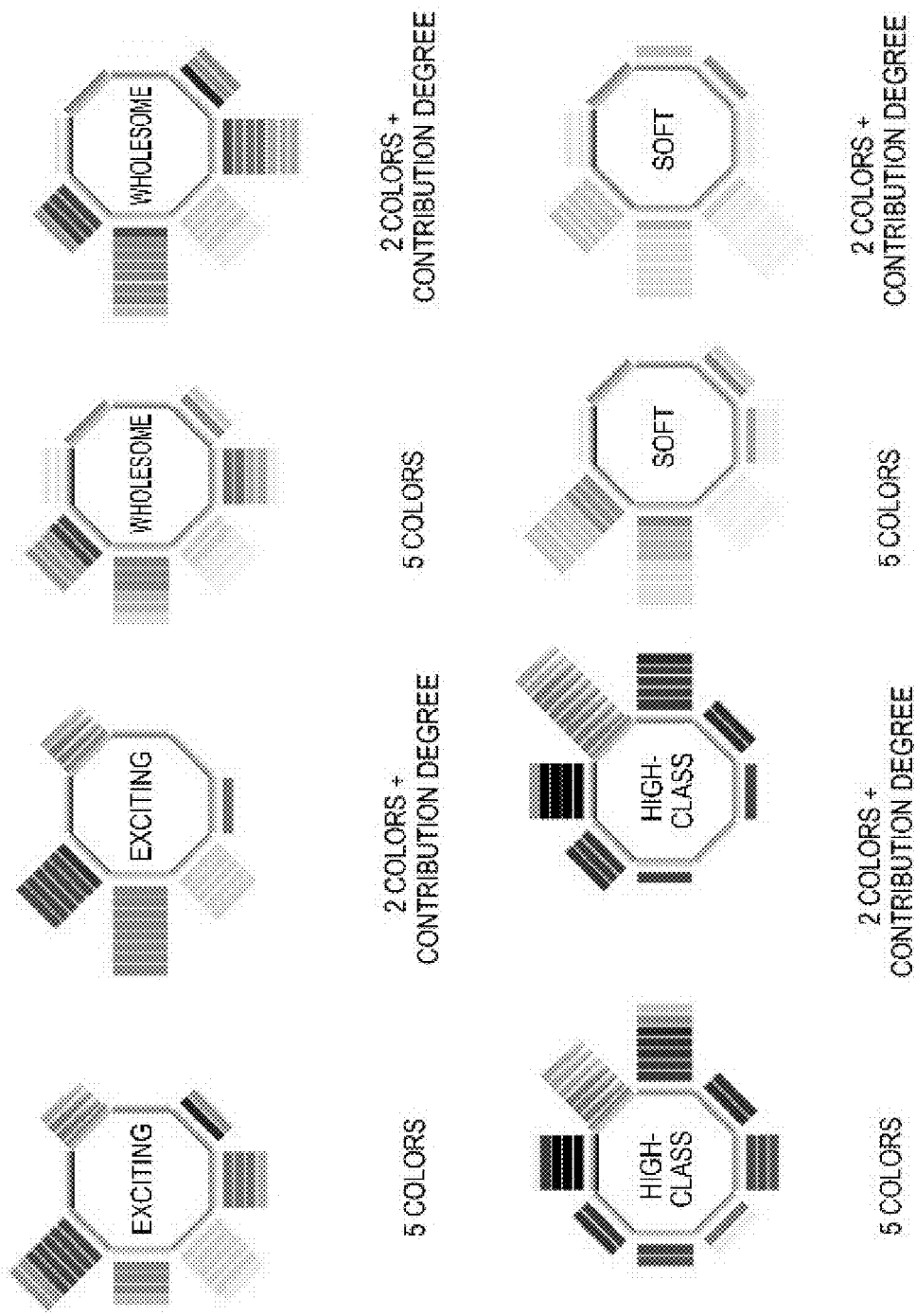
FIG. 11 is another example of rose diagram color expression drawings for text, created in Example 4 and Reference Example 1, for comparing cases in which the color samples and the contribution degrees selected and assigned by the subjects differ.
Figure 12:
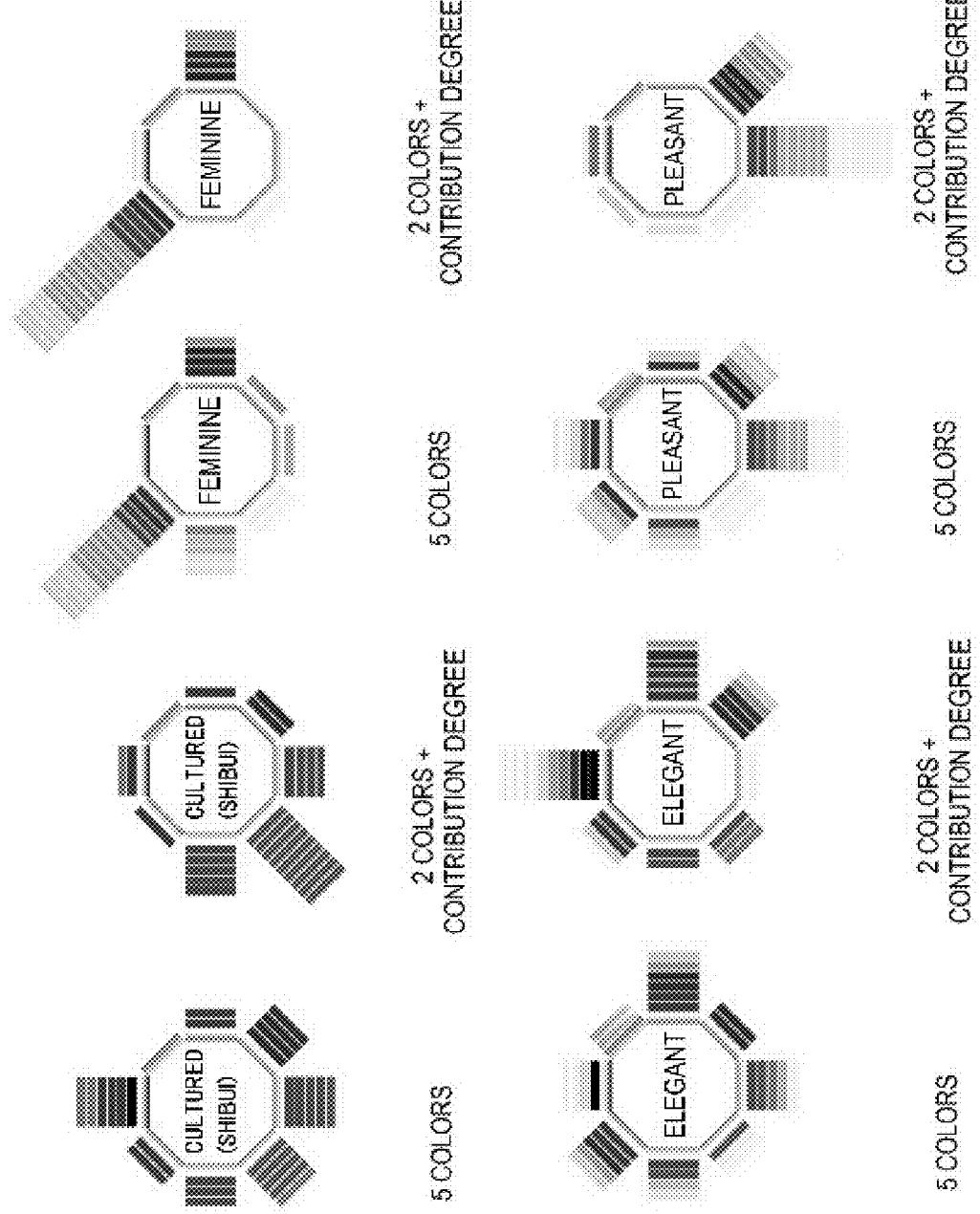
FIG. 12 is another example of rose diagram color expression drawings for text, created in Example 4 and Reference Example 1, for comparing cases in which the color samples and the contribution degrees selected and assigned by the subjects differ.
Figure 13:
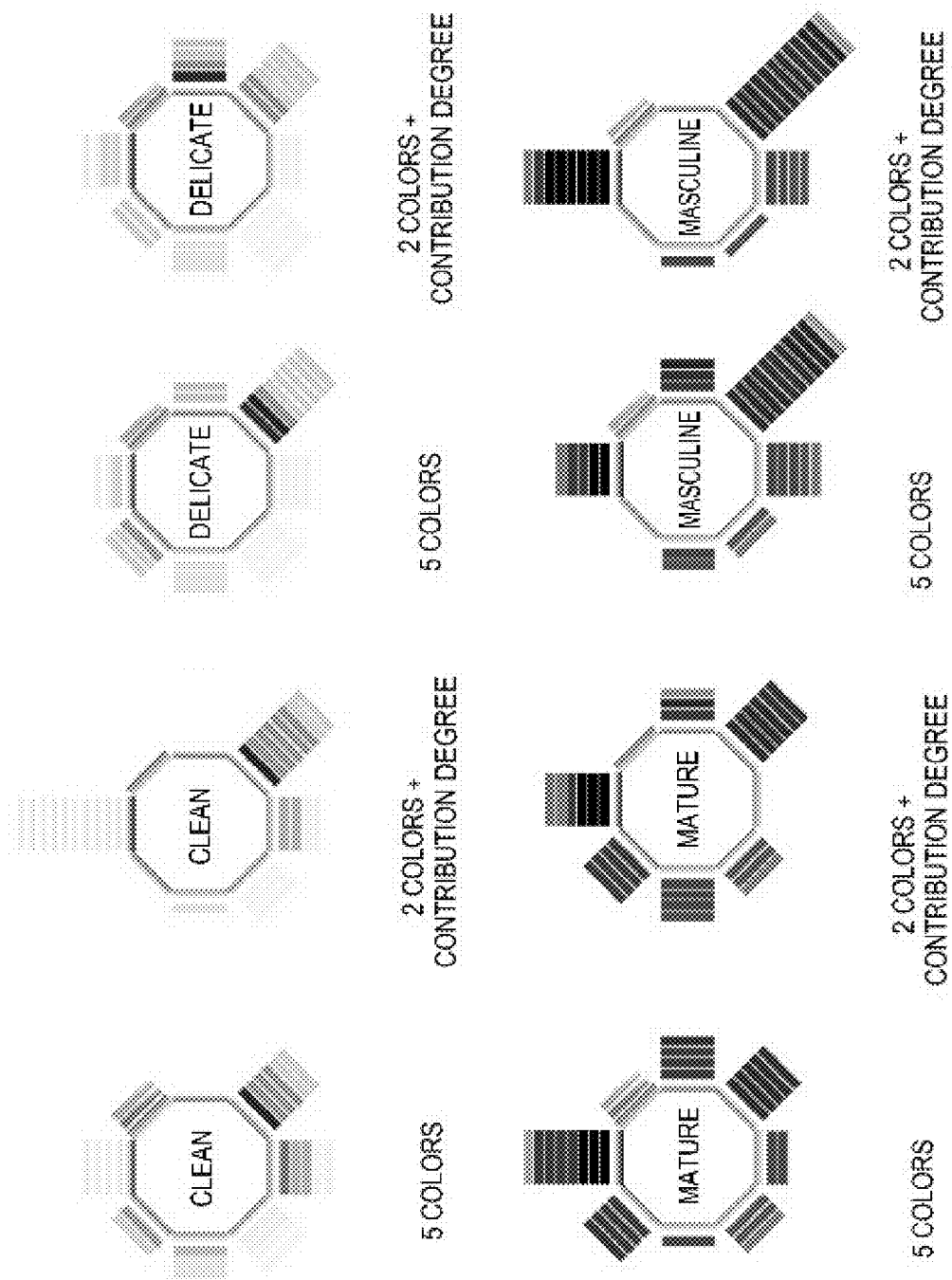
FIG. 13 is another example of rose diagram color expression drawings for text, created in Example 4 and Reference Example 1, for comparing cases in which the color samples and the contribution degrees selected and assigned by the subjects differ.
Figure 14:
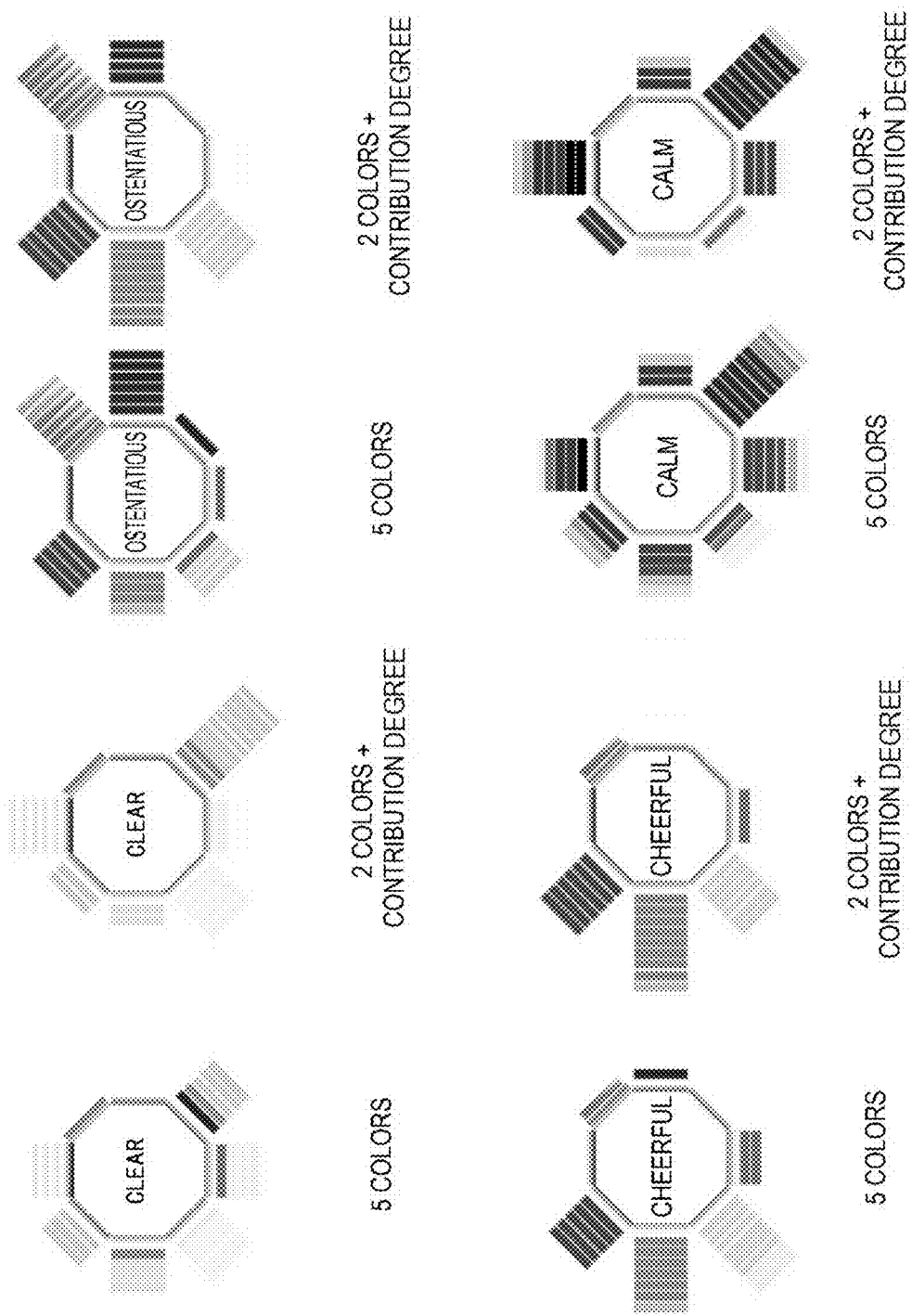
FIG. 14 is another example of rose diagram color expression drawings for text, created in Example 4 and Reference Example 1, for comparing cases in which the color samples and the contribution degrees selected and assigned by the subjects differ.
Figure 15:
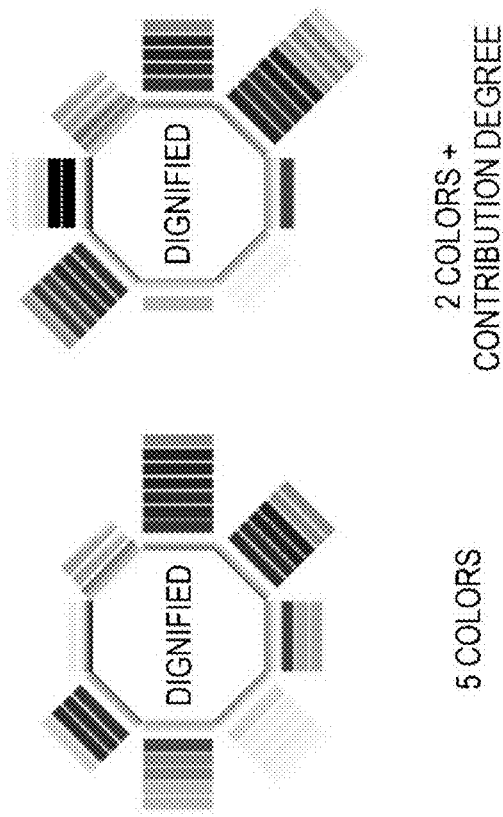
FIG. 15 is another example of rose diagram color expression drawings for text, created in Example 4 and Reference Example 1, for comparing cases in which the color samples and the contribution degrees selected and assigned by the subjects differ.

FIG. 7 illustrates a rose diagram color expression drawing in which the image of the text "gorgeous" is expressed.

Reference Example 1

Visualization of Image of Text

Rose diagram color expression drawings were created in the same manner as in Example 4, with the exceptions that the subjects were made to select up to five color types of color samples that matched the image of the text that the subjects viewed, and contribution degrees were not considered (that is, for example, when five types of color samples were selected, the contribution degrees were forcibly fixed at 20% each, and when four types of color samples were selected, the contribution degrees were forcibly fixed at 25% each).

FIGS. 8 to 15 illustrate rose diagram color expression drawings for the 29 words other than the text "gorgeous." In these rose diagram color expression drawings, the images of the texts used in Example 4 and Reference Example 1 are expressed using color. In FIGS. 8 to 15, the drawings marked "2 COLORS+CONTRIBUTION DEGREE" are rose diagram color expression drawings of the results of the subjects selecting, from the color sample group, S=2 types of color samples that match the image of the text viewed by the subjects in Example 4 and the contribution degrees (unit: percentage) of the color samples. In FIGS. 8 to 15, the drawings marked "5 COLORS" are rose diagram color expression drawings of the results of the subjects selecting, in Reference Example 1, up to five types of color samples that match the image of the text viewed by the subjects, without considering the contribution degrees (that is, for example, when five types of color samples were selected, the contribution degrees were forcibly fixed at 20% each, and when four types of color samples were selected, the contribution degrees were forcibly fixed at 25% each).

From FIGS. 8 to 15, it is clear that the pattern similarity is somewhat high between the rose diagrams when two types of color samples are selected and the contribution degrees are also considered and the rose diagrams when up to five types of color samples are selected but the contribution degrees are not considered, and that there is a clear trend that corresponds to the type of the text. Accordingly, with the method for expressing an image with colors of the present invention, even when the number of selected color samples is few (two types) it is clear that it is possible to visualize an image such that the reproducibility is high and the image can be intuitively shared with other people at substantially the same level as when selecting more color samples (maximum of five types) without considering the contribution degrees. Calculating the contribution degrees provides the benefit of enabling the features of the scent to be expressed, using colors, by a small number of subjects. Moreover, there is a benefit in that the subjectivity of the subjects (for example, the subject selects pink as the first color, black as the second color and, even though does not sense a third color, selects green; or attempts to more effectively express a single color in terms of blended colors) can be reflected in the contribution degrees. Therefore, with the method for expressing an image with colors of the present invention, the burden on the subjects is light.

Note that the pattern similarity can be measured by the method described in an example that is described later.

Example 5

Evaluation of Pattern Similarity Among Images of Texts

The pattern similarities among images of three types of text, namely "cute", "feminine", and "mature" calculated in Example 4 were evaluated.

Table 1 shows the selection rate, calculated in Example 4, of each color sample for the three types of text, namely "cute", "feminine", and "mature", the magnitude of a vector having the selection rates of the 38 types of color samples as 38 components, and the vector dot product with "cute" and the pattern similarity with "cute" for "feminine" and "mature." The color samples are represented in Table 1 using the numbers assigned in Example 1.

TABLE 1

|  | 11 | 12 | 13 | 14 | 15 | 16 | 21 | 22 | 23 |
|---|---|---|---|---|---|---|---|---|---|
| Cute | 0.14 | 0.15 | 0.06 | 0.00 | 0.00 | 0.00 | 0.44 | 0.03 | 0.06 |
| Feminine | 0.16 | 0.00 | 0.03 | 0.00 | 0.00 | 0.00 | 0.43 | 0.00 | 0.00 |
| Mature | 0.00 | 0.00 | 0.00 | 0.00 | 0.00 | 0.00 | 0.00 | 0.00 | 0.00 |
|  | 24 | 25 | 26 | 31 | 32 | 33 | 34 | 35 | 36 |
| Cute | 0.00 | 0.00 | 0.00 | 0.04 | 0.08 | 0.00 | 0.00 | 0.00 | 0.00 |
| Feminine | 0.00 | 0.00 | 0.08 | 0.11 | 0.00 | 0.00 | 0.00 | 0.00 | 0.10 |
| Mature | 0.00 | 0.00 | 0.03 | 0.00 | 0.00 | 0.00 | 0.00 | 0.00 | 0.03 |
|  | 41 | 42 | 43 | 44 | 45 | 46 | 51 | 52 | 53 | 54 |
| Cute | 0.00 | 0.00 | 0.00 | 0.00 | 0.00 | 0.00 | 0.00 | 0.00 | 0.00 | 0.00 |
| Feminine | 0.09 | 0.00 | 0.00 | 0.00 | 0.00 | 0.00 | 0.00 | 0.00 | 0.00 | 0.00 |
| Mature | 0.00 | 0.03 | 0.04 | 0.00 | 0.07 | 0.00 | 0.16 | 0.11 | 0.09 | 0.00 |
|  | 55 | 56 | 61 | 62 | 63 | 64 | 65 | 66 | 71 | 72 |
| Cute | 0.00 | 0.00 | 0.01 | 0.00 | 0.00 | 0.00 | 0.00 | 0.00 | 0.00 | 0.00 |
| Feminine | 0.00 | 0.00 | 0.02 | 0.00 | 0.00 | 0.00 | 0.00 | 0.00 | 0.00 | 0.00 |
| Mature | 0.17 | 0.03 | 0.00 | 0.00 | 0.00 | 0.08 | 0.02 | 0.14 | 0.00 | 0.00 |

|  | Magnitude of vector | Vector dot product with cute | Pattern similarity with cute ($\cos\theta$) |
|---|---|---|---|
| Cute | 0.50 | — | — |
| Feminine | 0.49 | 0.22 | 0.87 |
| Mature | 0.34 | 0.00 | 0.00 |

From Table 1, the pattern similarity $\cos\theta$ between "cute" and "feminine" is 0.87. Thus, it is clear that "cute" and "feminine" are similar.

However, the pattern similarity $\cos\theta$ between "cute" and "mature" is 0.00. Thus, it is clear that "cute" and "mature" are completely dissimilar.

Figure 16:
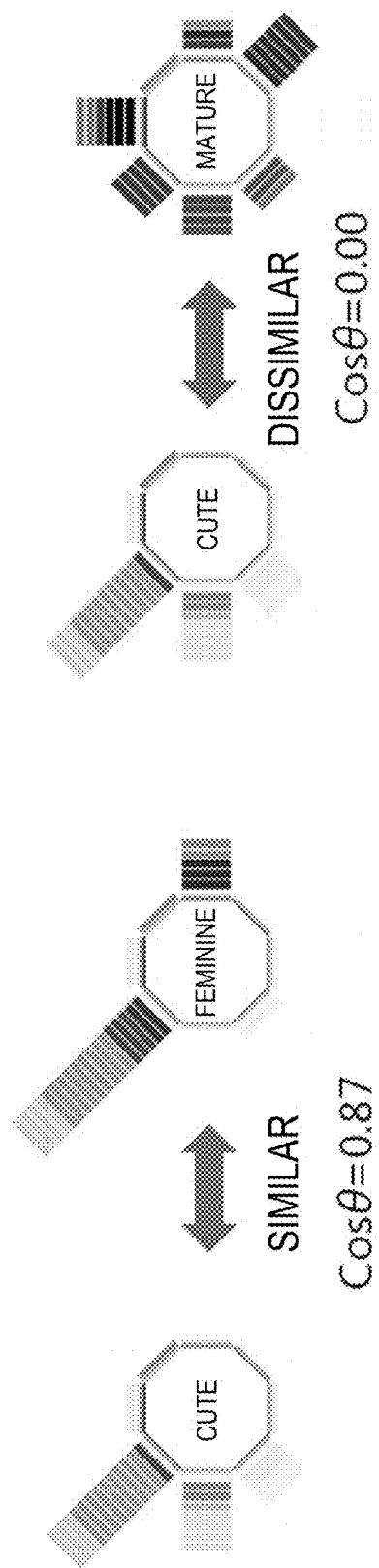
FIG. 16 is a schematic drawing illustrating the results of investigating, in Example 5, pattern similarity between the rose diagram color expression drawings for text.
Figure 17:
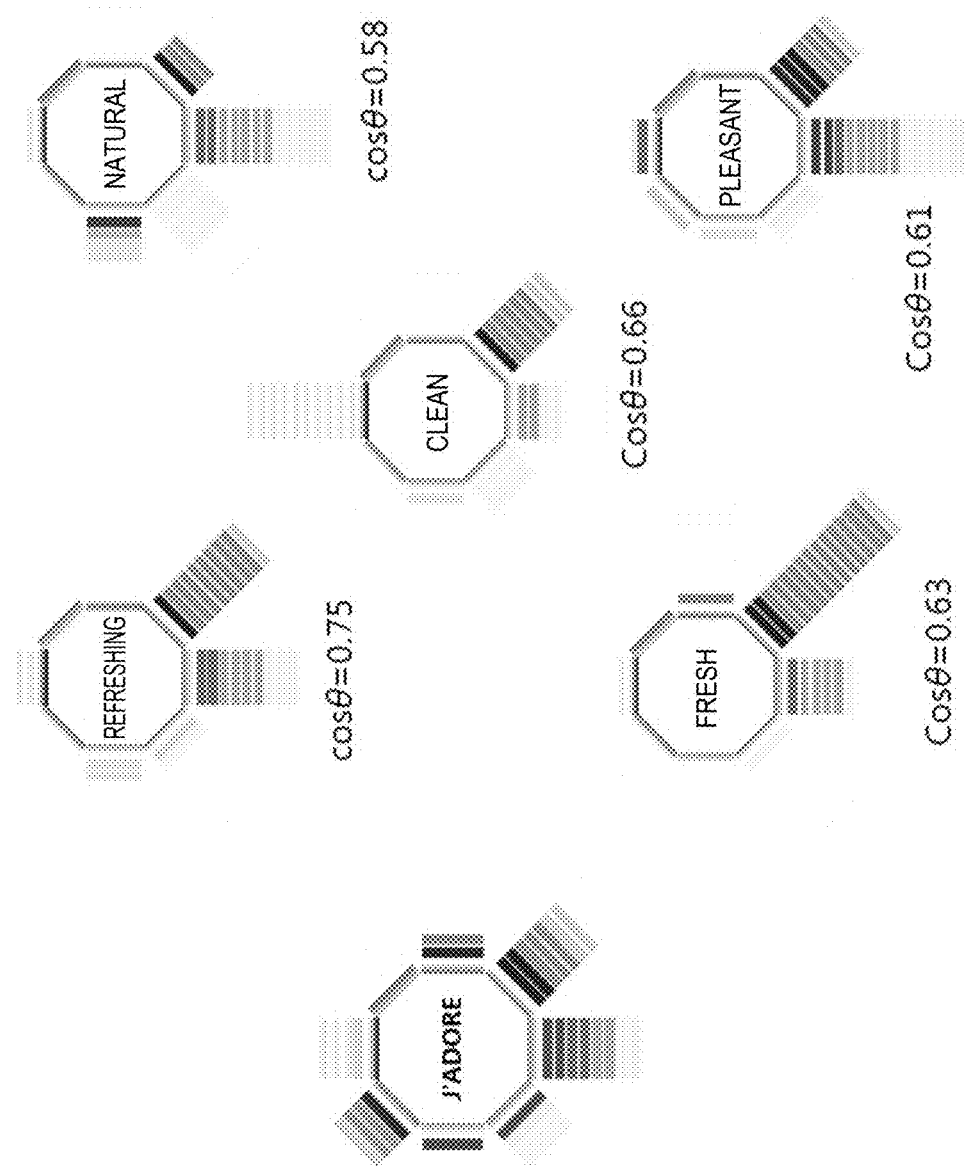
FIG. 17 is an example, investigated in Example 6, of a schematic drawing illustrating rose diagram color expression drawings for text of the five words with the highest pattern similarity to the example of the rose diagram color expression drawing for the scent of J'ADORE.
Figure 18:
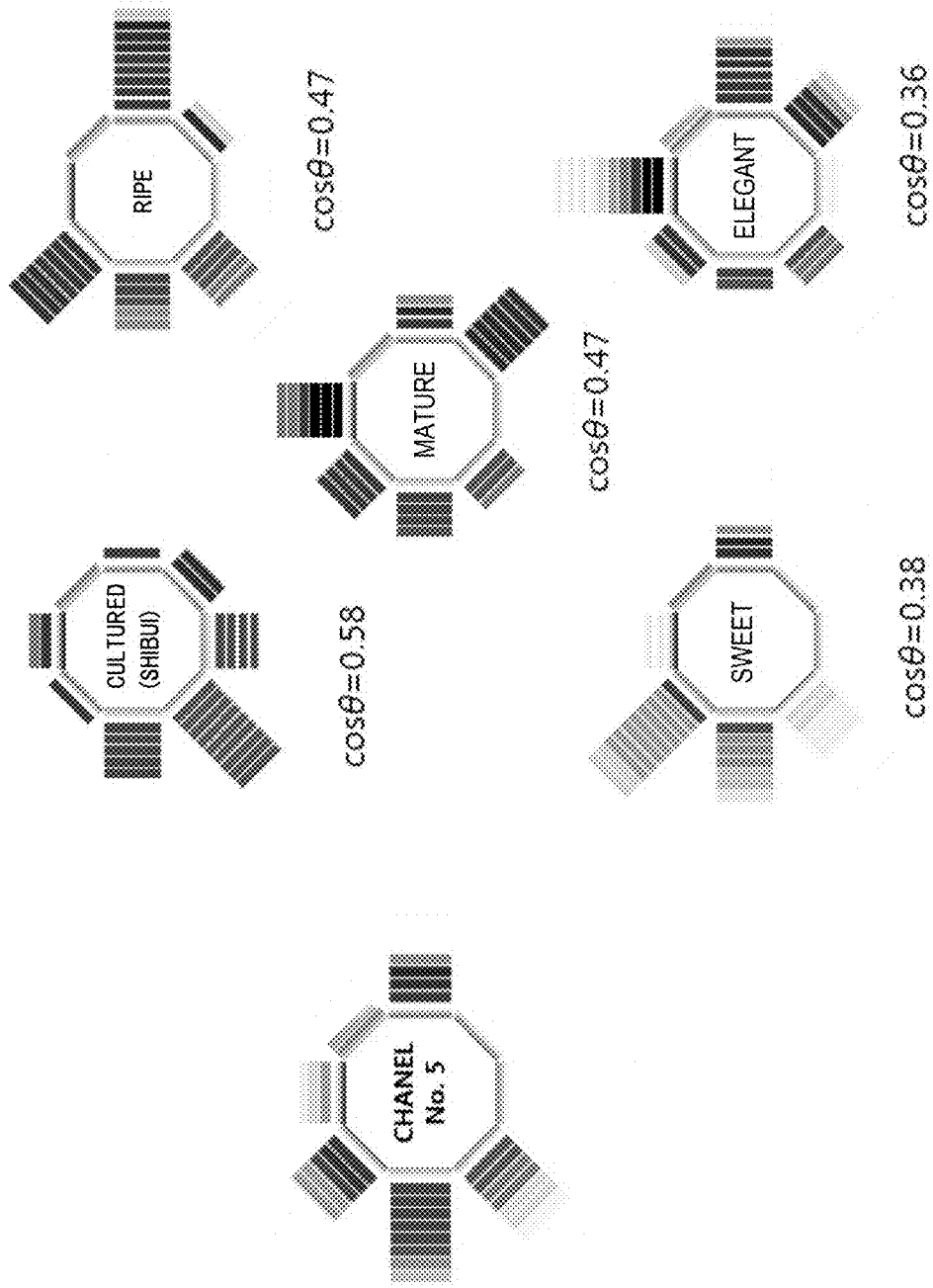
FIG. 18 is an example, investigated in Example 6, of a schematic drawing illustrating rose diagram color expression drawings for text of the five words with the highest pattern similarity to the example of the rose diagram color expression drawing for the scent of CHANEL No. 5.
Figure 19:
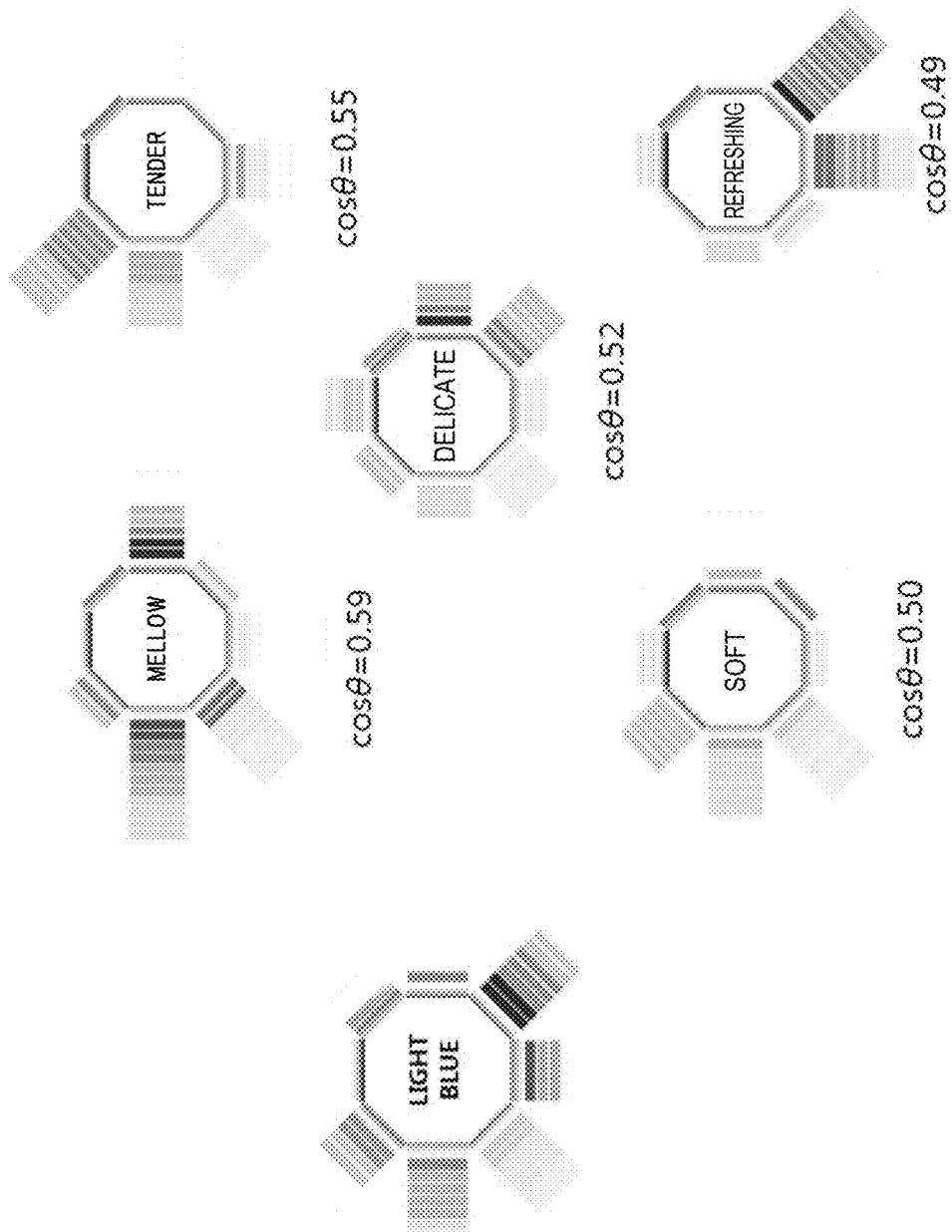
FIG. 19 is an example, investigated in Example 6, of a schematic drawing illustrating rose diagram color expression drawings for text of the five words with the highest pattern similarity to the example of the rose diagram color expression drawing for the scent of LIGHT BLUE.
Figure 20:
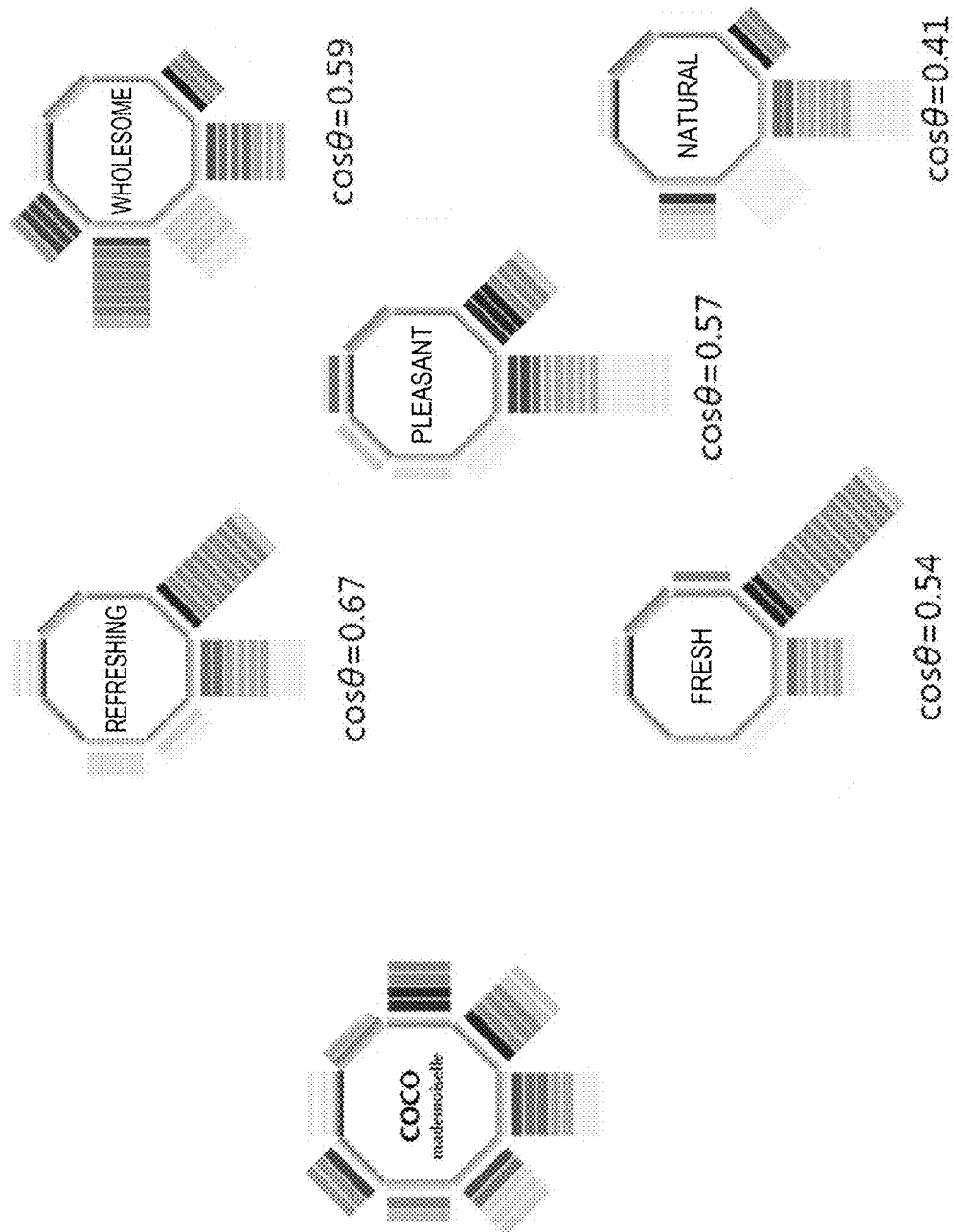
FIG. 20 is an example, investigated in Example 6, of a schematic drawing illustrating rose diagram color expression drawings for text of the five words with the highest pattern similarity to the example of the rose diagram color expression drawing for the scent of COCO mademoiselle.
Figure 21:
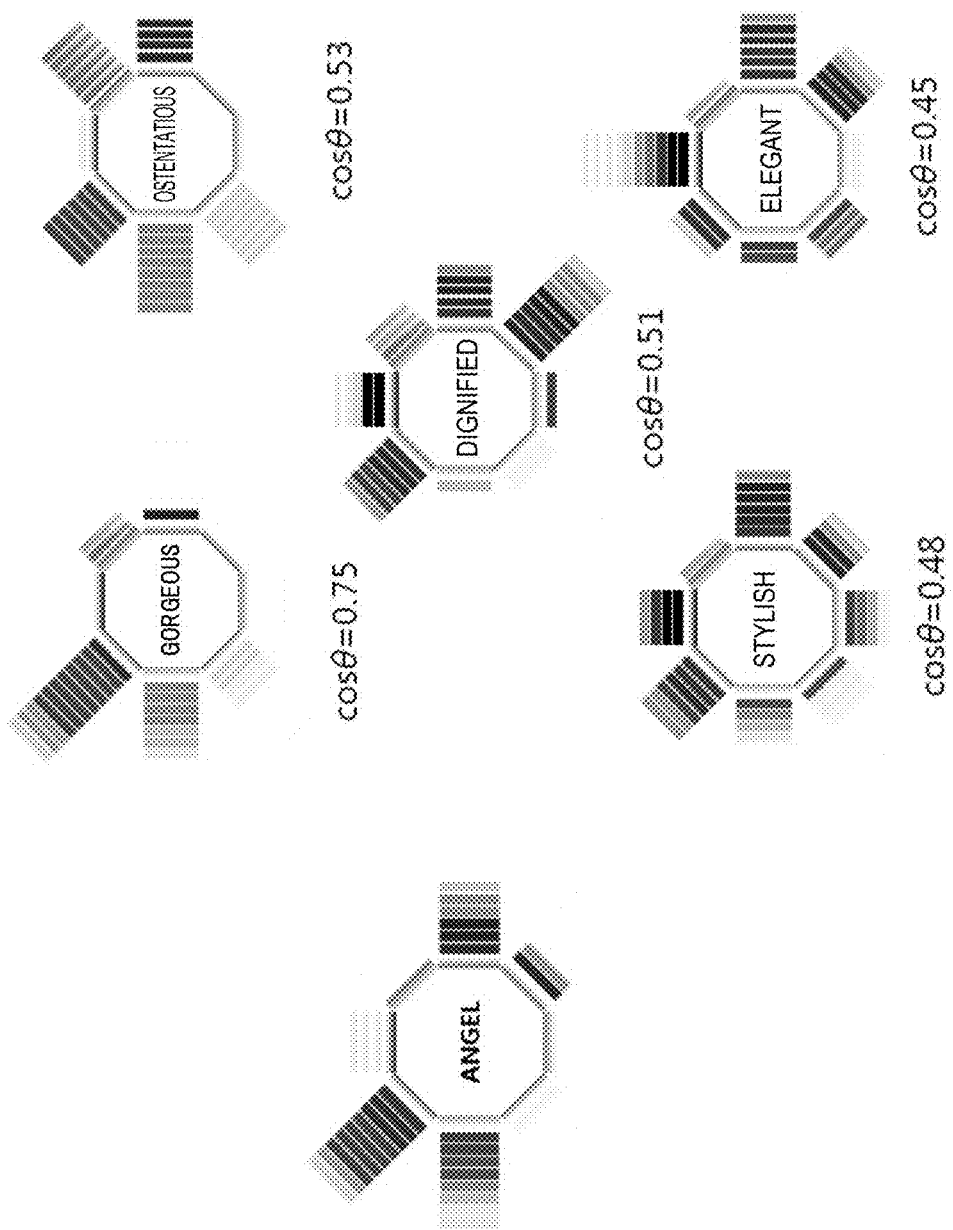
FIG. 21 is an example, investigated in Example 6, of a schematic drawing illustrating rose diagram color expression drawings for text of the five words with the highest pattern similarity to the example of the rose diagram color expression drawing for the scent of ANGEL.

These results are illustrated in FIG. 16. From FIG. 16, it is clear that, with the method for evaluating similarity between images of the present invention, it is possible to intuitively determine and adjust the similarity between rose diagram color expression drawings, and quantify the similarity.

Example 6

Evaluation of Pattern Similarity among Images of Scent and Images of Text

The pattern similarity among the images of the scents of the five types of perfumes obtained in Example 1 and the images of the 30 texts obtained in Example 4 was evaluated.

Specifically, the pattern similarity between the images of the scents of the five types of perfumes obtained in Example 1 and the images of the 30 texts obtained in Example 4 was calculated, and the top five images of text with the highest pattern similarity cos θ were determined.

The obtained results are illustrated in FIGS. 17 to 21.

The results demonstrate that the image of the scent of each perfume has high pattern similarity with the images of the following text.

(1) J'ADORE (Floral): "Refreshing", "clean", "fresh", "pleasant", "natural"

(2) CHANEL No. 5 (Floral): "Cultured(shibui)", "ripe", "mature", "sweet", "elegant"

(3) LIGHT BLUE (Woody): "Mellow", "tender", "delicate", "soft", "refreshing"

(4) COCO mademoiselle (Chypre): "Refreshing", "wholesome", "pleasant", "fresh", "natural"

(5) ANGEL (Oriental): "Gorgeous", "ostentatious", "dignified", "stylish", "elegant"

Thus, it is clear that the image of a scent can be associated with the image of a text by using the method for evaluating similarity between images of the present invention.

Note that, in addition to this example, pattern similarity between images of the scents of nine types of perfumes and images of Korean language texts written in Hangul was evaluated. In this case as well, high pattern similarity was found between the image of the scent of each perfume and the image of the text.

Example 7

Visualization of Image of Person
Persons
  The following names of persons were selected.
  Person 1: Keisuke Kuwata
  Person 2: Mao Asada
  Person 3: Kei Nishikori
  Person 4: Ryoko Yonekura The image of each of person was visualized using the names (in Kanji) of these four persons.

The same color samples used in Example 1 were used.

With the exception of making the subjects select, from the color sample group, S=2 types of color samples that match the image of the viewed person (name) and the contribution degrees (unit: percentage) of each of the color samples instead of the image of the scent of the smell material that the subjects smelled, the rose diagram color expression drawings were created in the same manner as in Example 1.

Figure 22:
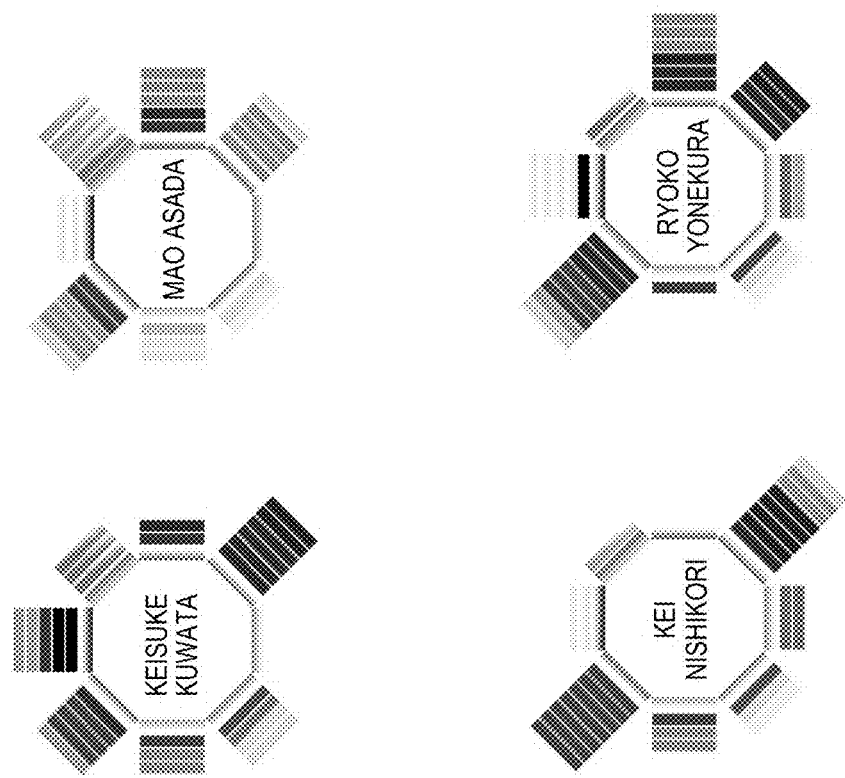
FIG. 22 is an example, created in Example 7, of rose diagram color expression drawings for people.

FIG. 22 illustrates rose diagram color expression drawings in which the images of the people (names) are expressed with color.

From FIG. 22, it is clear that, with the method for expressing an image with colors of the present invention, it is possible to visualize an image of a person such that the burden on the subject is light, reproducibility is high, and the image can be intuitively shared with other people.

Example 8

Evaluation of Correlation Coefficient: Comparison of Images of Scents

The correlation coefficient between the image of the scent of J'ADORE and the image of the scent of CHANEL No. 5, and the correlation coefficient between the image of the scent of J'ADORE and the image of the scent of COCO mademoiselle found in Example 1 were evaluated.

Table 2 depicts, for J'ADORE, CHANEL No. 5, and COCO mademoiselle, the contribution degrees of each color sample number, and sums, averages, and standard deviations of the contribution degrees (of all of the color samples). The color samples are represented using the numbers assigned in Example 1. In the results, since the number of subjects was 18, the sum of the contribution degrees of each perfume is 1800(%). The average and the standard deviation of the contribution degrees of each perfume were calculated.

TABLE 2

| COLOR NO. | J'ADORE | CHANEL No. 5 | COCO mademoiselle |
| --- | --- | --- | --- |
| 11 | 80 | 0 | 0 |
| 12 | 0 | 0 | 0 |
| 13 | 90 | 30 | 0 |
| 14 | 110 | 0 | 150 |
| 15 | 100 | 0 | 130 |
| 16 | 0 | 0 | 0 |
| 21 | 110 | 160 | 145 |
| 22 | 0 | 70 | 50 |
| 23 | 30 | 0 | 0 |
| 24 | 140 | 0 | 170 |
| 25 | 250 | 0 | 190 |
| 26 | 80 | 50 | 110 |
| 31 | 0 | 20 | 40 |
| 32 | 0 | 80 | 60 |
| 33 | 0 | 120 | 205 |
| 34 | 140 | 0 | 130 |
| 35 | 140 | 0 | 70 |
| 36 | 0 | 20 | 50 |
| 41 | 50 | 80 | 0 |
| 42 | 60 | 50 | 0 |
| 43 | 0 | 130 | 40 |
| 44 | 110 | 0 | 50 |
| 45 | 0 | 0 | 0 |
| 46 | 50 | 50 | 60 |
| 51 | 0 | 70 | 0 |
| 52 | 0 | 440 | 0 |
| 53 | 40 | 160 | 40 |
| 54 | 0 | 0 | 0 |
| 55 | 0 | 0 | 0 |
| 56 | 0 | 80 | 0 |
| 61 | 200 | 50 | 90 |
| 62 | 20 | 30 | 0 |
| 63 | 0 | 30 | 0 |
| 64 | 0 | 0 | 0 |
| 65 | 0 | 0 | 0 |
| 66 | 0 | 0 | 0 |
| 71 | 0 | 0 | 0 |
| 72 | 0 | 80 | 20 |
| SUM | 1800 | 1800 | 1800 |
| AVERAGE | 47.37 | 47.37 | 47.37 |
| STANDARD DEVIATION | 64.67 | 80.49 | 62.40 |

Figure 24A:
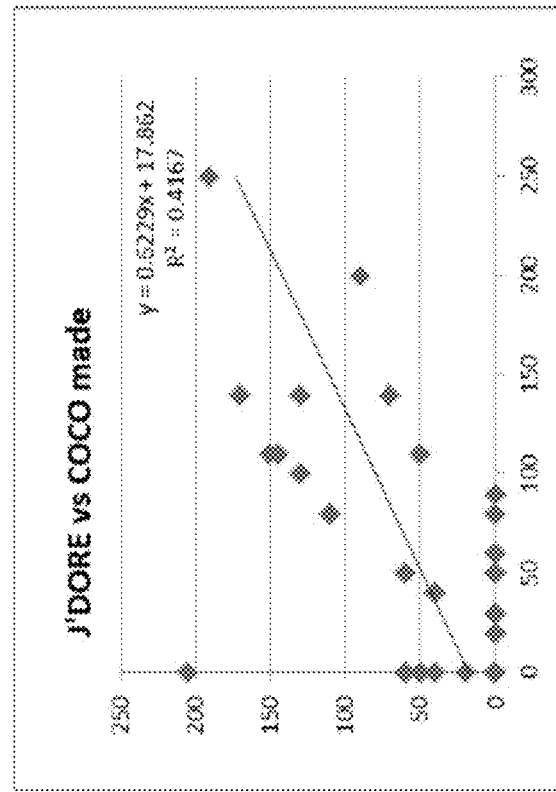
FIG. 24A is a scatter chart, with J'ADORE on the horizontal axis and CHANEL No. 5 on the vertical axis, in which the value of the sum of the contribution degrees of each color sample number is plotted.

A scatter chart with J'ADORE on the horizontal axis and CHANEL No. 5 on the vertical axis was created. In this scatter chart, the values of the sums of the contribution degrees of each color sample number were plotted. An approximate straight line was created by the least square method using the averages and the standard deviations shown in Table 2, and the correlation coefficient was calculated. The obtained results are illustrated in FIG. 24A. From FIG. 24A, the square of the correlation coefficient $R^2$ was calculated as 0.032.

Figure 24B:
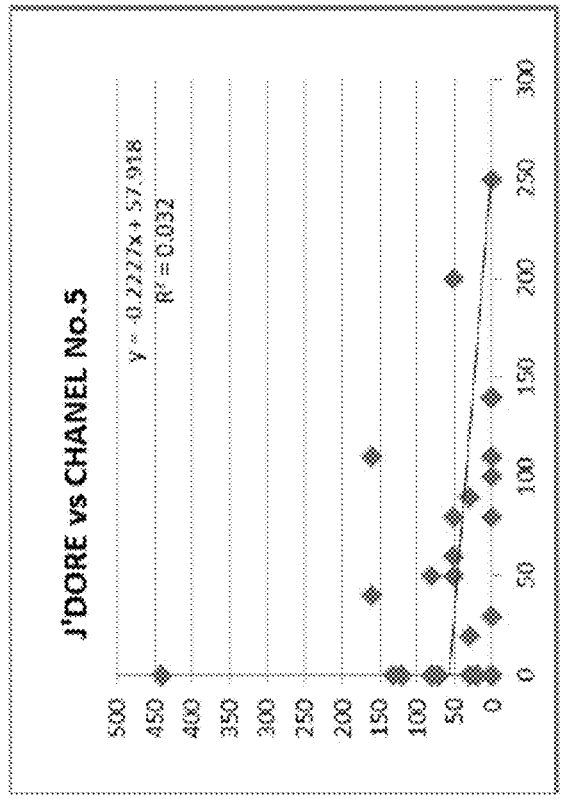
FIG. 24B is a scatter chart, with J'ADORE on the horizontal axis and COCO mademoiselle on the vertical axis, in which the value of the sum of the contribution degrees of each color sample number is plotted.

A scatter chart with J'ADORE on the horizontal axis and COCO mademoiselle on the vertical axis was created. In this scatter chart, the values of the sums of the contribution degrees of each color sample number were plotted. An approximate straight line was created by the least square method using the averages and the standard deviations shown in Table 2, and the correlation coefficient was calculated. The obtained results are illustrated in FIG. 24B. From FIG. 24B, the square of the correlation coefficient $R^2$ was calculated as 0.4167.

Note that, it is possible to determine whether R is positive or negative according to the slope of the approximate curve, and the correlation coefficient R can be found from the value of the square of the correlation coefficient $R^2$ and the slope of the approximate curve.

Example 9

Evaluation of Correlation Coefficient: Comparison of Image of Scent and Image of Text The correlation coefficients between two types of images among the five types of images of scents found in Example 1 and the images of the texts of "exciting", "cheerful", "gorgeous", and "wholesome" found in Example 4 were evaluated.

In Table 3, the contribution degree for each color sample number is shown for each image. The color samples are represented using the numbers assigned in Example 1.

As in Example 8, the average and the standard deviation of the contribution degree of each image were found from the results of Table 3, and the correlation coefficients R were calculated. The obtained results are noted in Table 4.

TABLE 3

| COLOR NO. | J'ADORE | CHANEL No. 5 | LIGHT BLUE | ANGEL | COCO mademoiselle | EXCITING | CHEERFUL | GORGEOUS | WHOLESOME |
|---|---|---|---|---|---|---|---|---|---|
| 11 | 80 | 0 | 130 | 10 | 0 | 0 | 0 | 30 | 0 |
| 12 | 0 | 0 | 50 | 90 | 0 | 0 | 0 | 70 | 0 |
| 13 | 90 | 30 | 140 | 50 | 0 | 0 | 0 | 0 | 0 |
| 14 | 110 | 0 | 0 | 0 | 150 | 0 | 0 | 0 | 0 |
| 15 | 100 | 0 | 160 | 0 | 130 | 0 | 0 | 0 | 0 |
| 16 | 0 | 0 | 0 | 20 | 0 | 0 | 0 | 0 | 0 |
| 21 | 110 | 160 | 90 | 40 | 145 | 0 | 0 | 150 | 40 |
| 22 | 0 | 70 | 270 | 80 | 50 | 0 | 40 | 160 | 40 |
| 23 | 30 | 0 | 190 | 0 | 0 | 0 | 0 | 170 | 160 |
| 24 | 140 | 0 | 110 | 0 | 170 | 0 | 0 | 0 | 230 |
| 25 | 250 | 0 | 190 | 70 | 190 | 0 | 0 | 0 | 110 |
| 26 | 80 | 50 | 60 | 130 | 110 | 0 | 0 | 0 | 0 |
| 31 | 0 | 20 | 0 | 300 | 40 | 430 | 570 | 710 | 230 |
| 32 | 0 | 80 | 60 | 20 | 60 | 760 | 720 | 280 | 480 |
| 33 | 0 | 120 | 170 | 0 | 205 | 480 | 460 | 150 | 280 |
| 34 | 140 | 0 | 0 | 0 | 130 | 60 | 50 | 0 | 180 |
| 35 | 140 | 0 | 130 | 0 | 70 | 0 | 0 | 0 | 30 |
| 36 | 0 | 20 | 0 | 100 | 50 | 0 | 0 | 30 | 0 |
| 41 | 50 | 80 | 0 | 130 | 0 | 40 | 0 | 50 | 0 |
| 42 | 60 | 50 | 0 | 120 | 0 | 0 | 0 | 0 | 30 |
| 43 | 0 | 130 | 0 | 0 | 40 | 0 | 0 | 0 | 0 |
| 44 | 110 | 0 | 40 | 0 | 50 | 0 | 0 | 0 | 70 |
| 45 | 0 | 0 | 0 | 0 | 0 | 0 | 0 | 0 | 0 |
| 46 | 50 | 50 | 0 | 80 | 60 | 0 | 0 | 0 | 0 |
| 51 | 0 | 70 | 0 | 70 | 0 | 0 | 0 | 0 | 0 |
| 52 | 0 | 440 | 0 | 110 | 0 | 0 | 0 | 0 | 0 |
| 53 | 40 | 160 | 0 | 0 | 40 | 0 | 0 | 0 | 0 |
| 54 | 0 | 0 | 0 | 0 | 0 | 0 | 0 | 0 | 0 |
| 55 | 0 | 0 | 0 | 70 | 0 | 0 | 0 | 0 | 0 |
| 56 | 0 | 80 | 0 | 0 | 0 | 0 | 0 | 0 | 0 |
| 61 | 200 | 50 | 0 | 210 | 90 | 0 | 0 | 0 | 20 |
| 62 | 20 | 30 | 0 | 0 | 0 | 0 | 0 | 0 | 0 |
| 63 | 0 | 30 | 0 | 0 | 0 | 0 | 0 | 0 | 0 |
| 64 | 0 | 0 | 0 | 0 | 0 | 0 | 0 | 0 | 0 |
| 65 | 0 | 0 | 0 | 0 | 0 | 0 | 0 | 0 | 0 |
| 66 | 0 | 0 | 0 | 0 | 0 | 0 | 0 | 0 | 0 |
| 71 | 0 | 0 | 0 | 0 | 0 | 110 | 60 | 80 | 0 |
| 72 | 0 | 80 | 10 | 0 | 20 | 20 | 0 | 20 | 0 |

TABLE 4

| COLOR NO. | J'ADORE | CHANEL No. 5 | LIGHT BLUE | ANGEL | COCO mademoiselle | EXCITING | CHEERFUL | GORGEOUS | WHOLESOME |
|---|---|---|---|---|---|---|---|---|---|
| J'ADORE | 1.00 | | | | | | | | |
| CHANEL No. 5 | −0.18 | 1.00 | | | | | | | |
| LIGHT BLUE | 0.34 | −0.09 | 1.00 | | | | | | |
| ANGEL | 0.10 | 0.17 | −0.11 | 1.00 | | | | | |
| COCO mademoiselle | 0.65 | −0.01 | 0.43 | −0.01 | 1.00 | | | | |
| EXCITING | −0.21 | 0.09 | 0.09 | 0.16 | 0.22 | 1.00 | | | |
| CHEERFUL | −0.21 | 0.08 | 0.10 | 0.26 | 0.21 | 0.99 | 1.00 | | |
| GORGEOUS | −0.21 | 0.02 | 0.14 | 0.53 | 0.06 | 0.68 | 0.77 | 1.00 | |
| WHOLESOME | 0.09 | −0.01 | 0.30 | 0.05 | 0.43 | 0.85 | 0.84 | 0.58 | 1.00 |

Example 10

Evaluation of Correlation Coefficient: Comparison of Image of Scent and Image of Text In Example 9, the correlation coefficients were found using the contribution degrees for each hue and the contribution degrees for each tone instead of the contribution degrees of the color sample numbers.

The following color sample numbers were assigned to each of the tones, and the sum of the contribution degrees of the following color sample numbers was calculated as the contribution degree of each tone.

Red: 11, 21, 31, 41, and 51
Orange: 12, 22, 32, 42, and 52
Yellow: 13, 23, 33, 43, and 53
Green: 14, 24, 34, 44, and 54
Blue: 15, 25, 35, 45, and 55
Purple: 16, 26, 36, 46, and 56
White: 61
Gray: 62, 63, 64, and 65
Black: 66
Gold: 71, Silver: 72

The following color sample numbers were assigned to each of the tones, and the sum of the contribution degrees of the following color sample numbers was calculated as the contribution degree of each hue.

Pale: 11, 12, 13, 14, 15, and 16
Light: 21, 22, 23, 24, 25, and 26
Vivid: 31, 32, 33, 34, 35, and 36
Deep: 41, 42, 43, 44, 45, and 46
Dark: 51, 52, 53, 54, 55, and 56

Table 5 shows the contribution degree for each hue and the contribution degree for each tone for each image. The color samples are represented using the numbers assigned in Example 1.

The aforementioned is an example of groups of color numbers used when evaluating similarity.

An evaluation using the following is also possible:
Achromatic colors: 61, 62, 63, 64, 65, and 66
Metallic colors: 71 and 72.

In addition, the correlation coefficient and pattern similarity can be found using classification based on color theory such as warm colors, cold colors, and neutral colors.

tion coefficient R when the contribution degree for each tone was used were each calculated. Furthermore, a value obtained multiplying the correlation coefficients R of the contribution degree for each hue and the contribution degree for each tone (Table 6, Hue×Tone) was calculated.

Table 6 shows the results for the images of the texts of "exciting", "cheerful", "gorgeous", and "wholesome" together with an excerpt of Table 4 (the correlation coefficients R when the contribution degrees of the color sample numbers are used).

|  | EXCITING | CHEERFUL | GORGEOUS | WHOLE-SOME |
|---|---|---|---|---|
| COLOR NO |  |  |  |  |
| EXCITING | 1.00 |  |  |  |
| CHEERFUL | 0.99 | 1.00 |  |  |
| GORGEOUS | 0.68 | 0.77 | 1.00 |  |
| WHOLESOME | 0.85 | 0.84 | 0.58 | 1.00 |
| HUE |  |  |  |  |
| EXCITING | 1.00 |  |  |  |
| CHEERFUL | 0.99 | 1.00 |  |  |
| GORGEOUS | 0.82 | 0.87 | 1.00 |  |
| WHOLESOME | 0.77 | 0.75 | 0.51 | 1.00 |
| TONE |  |  |  |  |
| EXCITING | 1.00 |  |  |  |
| CHEERFUL | 1.00 | 1.00 |  |  |
| GORGEOUS | 0.92 | 0.93 | 1.00 |  |
| WHOLESOME | 0.88 | 0.90 | 0.99 | 1.00 |
| HUE X TONE |  |  |  |  |
| EXCITING | 1.00 |  |  |  |
| CHEERFUL | 0.99 | 1.00 |  |  |
| GORGEOUS | 0.75 | 0.81 | 1.00 |  |
| WHOLESOME | 0.68 | 0.68 | 0.51 | 1.00 |

Figure 25:
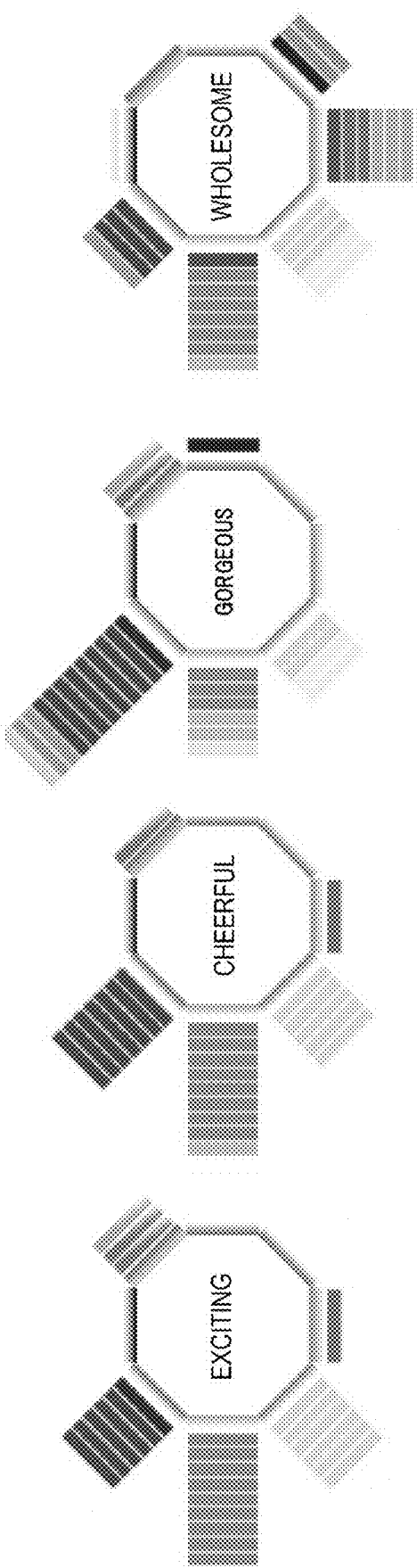
FIG. 25 illustrates rose diagram color expression drawings for the images of the texts "exciting", "cheerful", "gorgeous", and "wholesome"

The order of similarity, as subjectively observed, was evaluated by sense on the basis of the rose diagram color expression drawings, illustrated in FIG. 25, of the images of the texts of "exciting", "cheerful", "gorgeous", and "wholesome."

The results of this evaluation were as follows: The rose diagram of the image of the text "exciting" is very similar to

TABLE 5

|  |  | J'ADORE | CHANEL No. 5 | LIGHT BLUE | ANGEL | COCO mademoiselle | EXCITING | CHEERFUL | GORGEOUS | WHOLESOME |
|---|---|---|---|---|---|---|---|---|---|---|
| HUE | RED | 240 | 330 | 220 | 550 | 185 | 470 | 570 | 940 | 270 |
|  | ORANGE | 60 | 640 | 380 | 420 | 110 | 760 | 760 | 510 | 550 |
|  | YELLOW | 160 | 440 | 500 | 50 | 285 | 430 | 460 | 320 | 440 |
|  | GREEN | 500 | 0 | 150 | 0 | 500 | 60 | 50 | 0 | 480 |
|  | BLUE | 490 | 0 | 480 | 140 | 390 | 0 | 0 | 0 | 140 |
|  | PURPLE | 130 | 200 | 60 | 330 | 220 | 0 | 0 | 30 | 0 |
|  | WHITE | 200 | 50 | 0 | 210 | 90 | 0 | 0 | 0 | 20 |
|  | GRAY | 20 | 60 | 0 | 0 | 0 | 0 | 0 | 0 | 0 |
|  | BLACK | 0 | 0 | 0 | 0 | 0 | 0 | 0 | 0 | 0 |
|  | GOLD | 0 | 0 | 0 | 0 | 0 | 110 | 60 | 80 | 0 |
|  | SILVER | 0 | 80 | 10 | 0 | 20 | 20 | 0 | 20 | 0 |
| TONE | pale | 380 | 30 | 480 | 170 | 280 | 0 | 0 | 100 | 0 |
|  | light | 610 | 280 | 910 | 320 | 665 | 0 | 40 | 480 | 580 |
|  | vivid | 280 | 240 | 360 | 420 | 555 | 1730 | 1800 | 1170 | 1200 |
|  | deep | 270 | 310 | 40 | 330 | 150 | 40 | 0 | 50 | 100 |
|  | dark | 40 | 750 | 0 | 250 | 40 | 0 | 0 | 0 | 0 |

As in Example 8, the average and the standard deviation of the contribution degree of each image were found from the results of Table 5. The correlation coefficient R when the contribution degree for each hue was used and the correlathe rose diagram of the image of the text "cheerful"; the rose diagram of the image of the text "exciting" is somewhat similar to the rose diagram of the image of the text "gorgeous"; and the rose diagram of the image of the text "exciting" is not very similar to the rose diagram of the image of the text "wholesome."

From Table 6, it is clear that the values obtained by multiplying the correlation coefficients R of the contribution degree for each hue and the contribution degree for each tone (Table 6, Hue×Tone) are more similar to the results of evaluating, by sense, the order of similarity as subjectively observed than the correlation coefficients R from when the contribution degrees of the color sample numbers are used. Specifically, when both the contribution degree for the hue and the contribution degree for the tone were used, the correlation coefficient R between "exciting" and "cheerful" was very high at 0.99; the correlation coefficient R between "exciting" and "gorgeous" was slightly low at 0.75; and the correlation coefficient R between "exciting" and "wholesome" was significantly low at 0.68.

INDUSTRIAL APPLICABILITY

According to the present invention, it is possible to express, without words, images of scents, texts, persons, and the like using color, and the features of that color can be expressed in a color expression drawing. Information of the color expression drawing is easily conveyed, managed, and stored. As such, for example, the features of a plurality of images can be compared.

The present invention can, in particular, be used in the development of products that use fragrances or flavors to share evaluations of the image of the fragrance, the text, the person, or the like of the product, and also to change the image. Moreover, the present invention can be used when designing suitable packaging for such products, and can be used when determining color selection and color scheme when producing advertising materials.

What is claimed is:

1. A method for expressing an image with colors by creating a color expression drawing that corresponds to the image to be visualized via a first step, a second step and a third step, wherein:
   in the first step, n subject(s) each select(s), from among a color sample group that includes color samples including at least A×B types of color samples, S types of color samples that correspond to the image, and also assign(s) a contribution degree for each of the selected color samples;
   in the second step, an expression chart of each of the n subject(s) is created using the contribution degrees assigned in the first step and the color samples of the color sample group;
   in the third step, for each of the samples, the contribution degree(s) included in the expression chart(s) of the n subject(s) are summed, thereby obtaining the sums of the contribution degrees of the n subject(s) for the respective color samples,
   where $A \geq 2$, $B \geq 2$, $S \geq 2$ and $n \geq 1$.

2. The method for expressing an image with colors according to claim 1, wherein:
   the image is
      an image of a scent smelled by the subject,
      an image of a text viewed by the subject, or
      an image of a person viewed by the subject.

3. The method for expressing an image with colors according to claim 1, wherein:
   the color sample group includes a first system of A kinds of colors and a second system of B kinds of colors, and the A×B types of color samples are arranged in a first direction in order of the first system and, also, arranged in a second direction in order of the second system.

4. The method for expressing an image with colors according to claim 3, wherein:
   the first system is A kinds of hues and the second system is B kinds of tones, or the first system is A kinds of tones and the second system is B kinds of hues, and
   the tones are determined by lightness and saturation.

5. The method for expressing an image with colors according to claim 3, wherein
   the color sample group further includes a third system for color textures.

6. The method for expressing an image with colors according to claim 5, wherein:
   the third system includes at least one selected from the group consisting of metallic colors and achromatic colors.

7. The method for expressing an image with colors according to claim 3, wherein:
   the color expression drawing is a color arrangement table in which each of the colors is arranged in an arrangement identical to the color samples included in the color sample group;
   a portion corresponding to each of the colors of the color arrangement table includes a pallet(s); and
   (B1) the pallet is created using the sum of each of the colors, or a value obtained by converting, to a rate, the sum of each of the colors, or
   (B2) the pallets have the number of steps determined by converting the sum of each of the colors to a rate and standardizing the rate for each predetermined numerical range.

8. The method for expressing an image with colors according to claim 1, wherein:
   the color expression drawing is a graph in which at least A or less kinds of the first system of the color sample group are included to be set on one of a horizontal axis and a vertical axis, and
      (A1) values obtained by further summing the sum(s) for each kind of the first system, or
      (A2) values obtained by converting, to rates, the sum(s) for each kind of the first system
   are set on the other axis.

9. The method for expressing an image with colors according to claim 1, wherein:
   the color expression drawing is a rose diagram that includes a polygon shaped core,
   the polygon includes sides that each correspond to the kinds of the first system of the color sample group,
   pallets colored with the colors are each stacked on the side corresponding to the kind of the first system to which each color belongs,
   the number of steps of the pallets on each side is determined by converting, to a rate, sum of the contribution degree(s) of all of the color(s) belonging to each kind of the first system corresponding to the side and standardizing the rate for each predetermined numerical range.

10. The method for expressing an image with colors according to claim 9, wherein:
    the polygon further includes sides that correspond to a kind(s) of the third system of the color sample group.

11. The method for expressing an image with colors according to claim 10, wherein a shape of the pallet is circular or a polygonal shape with at least three sides.

12. A method for compounding a scent, comprising:
- a fourth step in which an evaluator, that has smelled a scent included in a set that includes a color expression drawing created according to the method for expressing an image with colors according to claim 1 and the scent, expresses an image to which the scent is to be changed using the colors included in the color expression drawing, and/or the colors not included in the color expression drawing but included in the color sample group;
- a fifth step in which a new scent to be visualized that matches the image to which the scent is to be changed and which is expressed in the fourth step is compounded;
- a sixth step in which an image of the new scent is expressed by a new color expression drawing created by the method for expressing an image with colors according to claim 1; and
- a seventh step in which similarity is confirmed between the image to which the scent is to be changed expressed in the fourth step, and the color expression drawing expressed in the sixth step.

13. The method for compounding a scent according to claim 12, wherein:
- in the fourth step, the image to which the scent is to be changed is expressed by the color expression drawing, and the similarity between the color expression drawing created in the fourth step and the color expression drawing expressed in the sixth step is determined on the basis of a correlation coefficient or a pattern similarity, wherein
- the correlation coefficient or the pattern similarity is calculated by using
- the sum(s), or a value obtained by converting the sum to a rate.

14. A color expression drawing corresponding to an image to be visualized and created by a first step, a second step and a third step, wherein:
- in the first step, n subject(s) each select(s), from among a color sample group that includes color samples including at least A×B types of color samples, S types of color samples that correspond to an image, and also assign(s) a contribution degree for each of the selected color samples;
- in the second step, an expression chart of each of the n subject(s) is created by the contribution degrees assigned in the first step and the color samples of the color sample group;
- in the third step, for each of the samples, the contribution degree(s) included in the expression chart(s) of the n subject(s) are summed, thereby obtaining the sums of the contribution degrees of the n subject(s) for the respective color samples,
- where $A \geq 2$, $B \geq 2$, $S \geq 2$ and $n \geq 1$.

15. The color expression drawing according to claim 14, wherein
- the color expression drawing is a graph in which at least A or less kinds of the first system of the color sample group are included to be set on one of a horizontal axis and a vertical axis, and
  - (A1) values obtained by further summing the sum(s) for each kind of the first system, or
  - (A2) values obtained by converting, to rates, the sum(s) for each kind of the first system
- are set on the vertical other axis.

16. The color expression drawing according to claim 14, wherein:
- the color expression drawing is a rose diagram that includes a polygon shaped core,
- the polygon includes sides that correspond to the kinds of the first system of the color sample group,
- pallets colored with the colors are each stacked on the side corresponding to the kind of the first system to which each color belongs,
- the number of steps of the pallets on each side is determined by converting, to a rate, sum of the contribution degree(s) of all of the color(s) belonging to each kind of the first system corresponding to the side and standardizing the rate for each predetermined numerical range.

17. The color expression drawing according to claim 16, wherein:
- the polygon further includes sides that correspond to a kind(s) of the third system of the color sample group.

18. The color expression drawing according to claim 17, wherein a shape of the pallet is circular or a polygonal shape with at least three sides.

19. The color expression drawing according to claim 14, wherein:
- the color sample group includes a first system of A kinds of colors and a second system of B kinds of colors, and
- the color sample group includes a portion arranged in a first direction in order of the first system and, also, arranged in a second direction in order of the second system.

20. The color expression drawing according to claim 19, wherein:
- the color expression drawing is a color arrangement table in which each of the colors is arranged in an arrangement identical to the color samples included in the color sample group;
- a portion corresponding to each of the colors of the color arrangement table includes a pallet(s); and
- (B1) the pallet is created using the sums of each of the colors, or a value obtained by converting, to a rate, the sums of each of the colors, or
- (B2) the pallets have the number of steps determined by converting the sum of each of the colors to a rate and standardizing the rate for each predetermined numerical range.

* * * * *